US012562575B2

(12) United States Patent
Xiao et al.

(10) Patent No.: US 12,562,575 B2
(45) Date of Patent: Feb. 24, 2026

(54) PHOTOVOLTAIC INVERTER AND CONTROL METHOD THEREOF, AND PHOTOVOLTAIC SYSTEM

(71) Applicant: Huawei Digital Power Technologies Co., Ltd., Shenzhen (CN)

(72) Inventors: Gang Xiao, Shenzhen (CN); Chongyue Huang, Shanghai (CN); Guilei Gu, Shanghai (CN); Zhengang Song, Xi'an (CN); Wentao Liu, Xi'an (CN); Xuegong Li, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/619,287

(22) Filed: Mar. 28, 2024

(65) Prior Publication Data

US 2024/0380212 A1     Nov. 14, 2024

(30) Foreign Application Priority Data

May 11, 2023     (CN) .......................... 202310533497.2

(51) Int. Cl.
*H02J 3/00*          (2006.01)
*H02J 3/28*          (2006.01)
*H02J 3/38*          (2006.01)
(Continued)

(52) U.S. Cl.
CPC ..................................... *H02J 3/38* (2013.01); *H02J 3/28* (2013.01); *H02M 1/0067* (2021.05); *H02M 7/483* (2013.01); *H02J 2300/26* (2020.01)

(58) Field of Classification Search
CPC ...... Y02E 10/56; Y02E 10/50; H02M 1/0009; H02M 3/157; H02M 1/0067; H02M 7/483;
(Continued)

(56) References Cited

U.S. PATENT DOCUMENTS 5,327,335 A * 7/1994 Maddali .............. H02M 7/5395
                                                             363/39
9,698,710 B2 7/2017 Kataoka et al.
(Continued)

FOREIGN PATENT DOCUMENTS

CN          104113079 A      10/2014
CN          107330566 A      11/2017
(Continued)

*Primary Examiner* — Tuan T Lam
(74) *Attorney, Agent, or Firm* — Maier & Maier, PLLC

(57)                ABSTRACT

A photovoltaic inverter and a control method thereof, and a photovoltaic system. The photovoltaic inverter system includes a voltage conversion circuit, an inverter circuit, and a controller. The controller is configured to increase, based on an output power of the inverter circuit in a current time period and an output power of the inverter circuit in a first time period, an output power of the inverter circuit when the voltage conversion circuit does not work in a maximum power state. An increase of the output power of the inverter circuit is an estimated power increment value of the inverter circuit so as to stably increase an output power of the inverter while ensuring stable operation of the inverter and safe use of a power component, and improve power supply efficiency of the photovoltaic system.

18 Claims, 5 Drawing Sheets

(51) Int. Cl.
_H02M 1/00_ (2006.01)
_H02M 7/483_ (2007.01)

(58) Field of Classification Search
CPC .. H02M 3/04; H02M 7/44; H02J 3/466; H02J 3/38; H02J 3/28; H02J 2300/26; H02J 2300/24; H02J 3/381; H02J 3/32; H02J 7/35; H03J 7/0068
See application file for complete search history.

(56) References Cited

U.S. PATENT DOCUMENTS

| | | | | |
|---|---|---|---|---|
| 10,705,551 | B2 | 7/2020 | Adest et al. | |
| 10,749,446 | B2 * | 8/2020 | Gong | H02J 3/24 |
| 2012/0047386 | A1 * | 2/2012 | Matsui | H02J 3/46 |
| | | | | 713/340 |
| 2012/0235484 | A1 * | 9/2012 | Yamada | H02J 3/32 |
| | | | | 307/43 |
| 2015/0244255 | A1 * | 8/2015 | Chen | H02M 7/48 |
| | | | | 363/97 |
| 2019/0173287 | A1 * | 6/2019 | Ge | H02J 7/35 |
| 2020/0403412 | A1 * | 12/2020 | Kang | H02J 3/381 |
| 2023/0187994 | A1 * | 6/2023 | Zhou | H02K 5/08 |
| | | | | 310/85 |
| 2024/0364117 | A1 * | 10/2024 | Belur | H02J 3/381 |
| 2025/0062619 | A1 * | 2/2025 | Zhang | H02J 3/381 |
| 2025/0087993 | A1 * | 3/2025 | Yang | H02M 7/53871 |

FOREIGN PATENT DOCUMENTS

| | | |
|---|---|---|
| CN | 110034570 A | 7/2019 |
| CN | 112531771 A | 3/2021 |
| WO | 2015011781 A1 | 1/2015 |

\* cited by examiner

Increase, based on an output power of an inverter circuit in a current time period and an output power of the inverter circuit in a first time period, an output power of the inverter circuit when a voltage conversion circuit does not work in a maximum power state

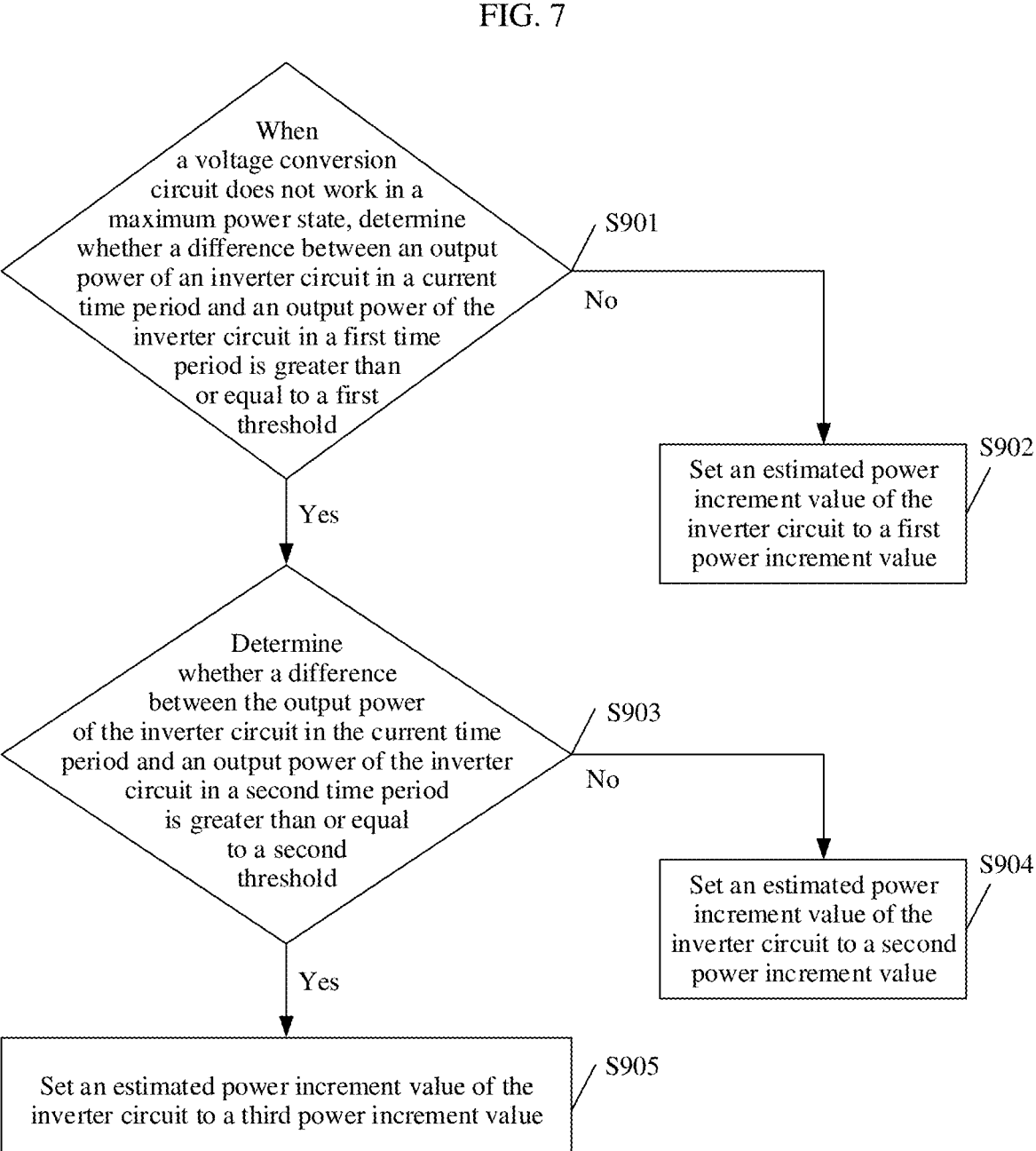

When a voltage conversion circuit does not work in a maximum power state, determine whether a difference between an output power of an inverter circuit in a current time period and an output power of the inverter circuit in a first time period is greater than or equal to a first threshold

S901

No

Yes

Set an estimated power increment value of the inverter circuit to a first power increment value

S902

Determine whether a difference between the output power of the inverter circuit in the current time period and an output power of the inverter circuit in a second time period is greater than or equal to a second threshold

S903

No

Yes

Set an estimated power increment value of the inverter circuit to a second power increment value

S904

Set an estimated power increment value of the inverter circuit to a third power increment value

PHOTOVOLTAIC INVERTER AND CONTROL METHOD THEREOF, AND PHOTOVOLTAIC SYSTEM

CROSS-REFERENCE TO RELATED APPLICATION

This application claims priority to Chinese Patent Application No. 202310533497.2, filed on May 11, 2023, which is hereby incorporated by reference in its entirety.

TECHNICAL FIELD

The embodiments relate to the field of power electronics technologies and to a photovoltaic inverter and a control method thereof, and a photovoltaic system.

BACKGROUND

In the field of power electronics technologies, an inverter circuit in a photovoltaic inverter is usually used to convert direct current electric energy into alternating current electric energy, so that the electric energy is transmitted between a power supply (for example, a photovoltaic module) and a load. In such a photovoltaic system, the photovoltaic inverter usually needs to adjust a supply power (for example, an output power) based on a power supply capability of the photovoltaic module, so that a voltage conversion circuit works at a maximum power point. This process is referred to as maximum power point tracking (MPPT). Generally, in actual application, the photovoltaic inverter may be further connected to an energy storage unit. The photovoltaic inverter herein may convert a part of direct current electric energy output by the photovoltaic module into alternating current electric energy, provide the alternating current electric energy for the load or a power grid to use, and store, in the energy storage unit, the other part of direct current electric energy output by the photovoltaic module. It has been found that, in the conventional technology, when the photovoltaic inverter charges the energy storage unit at a full power or when the energy storage unit is in a full-charged state, if the photovoltaic inverter needs to increase an output power of the inverter circuit in a maximum power point tracking process, a charge power of the energy storage unit may be decreased or the energy storage unit may change from charging to discharging. As a result, the inverter or a control module of the inverter detects that the energy storage unit is charged at a lower power or the energy storage unit is in a discharge state, and decreases an output power of the inverter. This control method may cause the energy storage unit to repeatedly switch between a charge state and the discharge state, or cause a system grid-connected power to repeatedly fluctuate, and consequently, the inverter cannot stably work at a maximum power point. This increases power supply costs, and has poor adaptability.

SUMMARY

The embodiments provide a photovoltaic inverter and a control method thereof, and a photovoltaic system, to prevent a decrease of a bus voltage in a process of increasing an output power of an inverter circuit by the photovoltaic system based on an excessively large step, improve stability of the bus voltage, stably increase an output power of the inverter while ensuring stable operation of the inverter and safe use of a power component, and improve power supply efficiency of the photovoltaic system.

According to a first aspect, the embodiments provide a photovoltaic inverter. The photovoltaic inverter includes a voltage conversion circuit, an inverter circuit, and a controller. Herein, one end of the voltage conversion circuit may be configured to connect to a photovoltaic module, the other end of the voltage conversion circuit may be configured to connect to one end of the inverter circuit, the other end of the inverter circuit may be configured to connect to a power grid, and the inverter circuit and the power grid are connected to a grid-connected point. The voltage conversion circuit herein may be configured to output, to the inverter circuit, a direct current input by the photovoltaic module. The inverter circuit herein is configured to: receive the direct current output by the voltage conversion circuit, convert the received direct current output by the voltage conversion circuit into an alternating current, and output the alternating current to the power grid. The controller herein may be configured to increase, based on an output power of the inverter circuit in a current time period and an output power of the inverter circuit in a first time period, an output power of the inverter circuit when the voltage conversion circuit does not work in a maximum power state. Herein, an increase of the output power of the inverter circuit may be referred to as an estimated power increment value of the inverter circuit, and the estimated power increment value of the inverter circuit is in direct proportion to a difference between the output power in the current time period and the output power in the first time period. Herein, being in direct proportion may be a linear function relationship, or may be a positive correlation relationship of a non-linear function. For example, if the difference between the output power of the inverter circuit in the current time period and the output power of the inverter circuit in the first time period is x, the estimated power increment value $\Delta P$ of the inverter circuit may be calculated according to a formula $\Delta P = k \times x + A$, where k and A are coefficients or parameters designed based on a specific application scenario. The first time period is before the current time period.

In the embodiments, the photovoltaic module (or a photovoltaic string including a plurality of photovoltaic modules) may be used as a power supply to connect to the power grid by using the photovoltaic inverter, and the photovoltaic inverter may convert direct current electric energy provided by the photovoltaic module into alternating current electric energy, and provide the alternating current electric energy for the power grid. Herein, the photovoltaic inverter may include the voltage conversion circuit and the inverter circuit. The voltage conversion circuit may convert an output voltage of the photovoltaic module into a direct current voltage that matches the inverter circuit, and transmit the direct current voltage to the inverter circuit. The inverter circuit may convert direct current electric energy into alternating current electric energy, so that electric energy output by the inverter circuit can adapt to an alternating current power grid.

In a photovoltaic power supply scenario, to maximize use of electric energy generated by the photovoltaic module, the photovoltaic inverter may supply power by using a maximum power point tracking (MPPT) technology, that is, control an output power of the inverter, to enable the photovoltaic module to work at a maximum power point, so that the inverter can output electric energy to the power grid at a maximum output power. However, in some cases, for example, if an output power required by the power grid (including a load) is low, the output power of the inverter also needs to be controlled to be in a non-MPPT state, that is, the inverter does not work in a maximum power state. In the non-MPPT state, the output power of the inverter may need to be increased according to a scheduling instruction. However, the maximum output power of the inverter is unknown when the inverter is in the non-MPPT state. In this case, the output power of the inverter is increased too much. As a result, the output power of the inverter exceeds a power output capability of the inverter. This may cause system breakdown.

In the embodiments, a concept of the estimated power increment value is introduced. The controller may adjust the output power of the inverter based on the estimated power increment value. It should be understood that the output power of the inverter is determined by the output power of the inverter circuit in the inverter, and the output power of the inverter circuit is limited by an output power of the previous-stage voltage conversion circuit. In other words, a power output capability of the previous-stage voltage conversion circuit needs to be considered for the increase of the output power of the inverter, and the estimated power increment value herein may be obtained based on the output power of the inverter circuit in the current time period and the output power of the inverter circuit in the first time period. It may be understood that the controller may evaluate a capability of outputting electric energy by the voltage conversion circuit in the current time period based on the output power of the inverter circuit in the current time period and the output power of the inverter circuit in the first time period, to obtain an estimated power increment value of an appropriate magnitude, and adjust the output power of the inverter based on the estimated power increment value. In other words, the controller may obtain an estimated power increment value of an appropriate magnitude based on an output power of the inverter circuit between the current time period and the first time period, and adjust the output power of the inverter based on the estimated power increment value. This can avoid a decrease of a bus voltage that is caused in a process of increasing the output power of the inverter circuit by the photovoltaic system based on an excessively large step, improve stability of the bus voltage, stably increase the output power of the inverter while ensuring stable operation of the inverter and safe use of a power component, and improve power supply efficiency of the photovoltaic system.

With reference to the first aspect, in a first possible implementation, the other end of the voltage conversion circuit may be configured to connect to an energy storage unit, and is configured to output, to the energy storage unit, a direct current input by the photovoltaic module. The inverter circuit herein may be configured to: receive the direct current output by the energy storage unit, convert the received direct current output by the energy storage unit into an alternating current, and output the alternating current to the power grid.

It may be understood that, when the photovoltaic inverter does not work in the maximum power state, the power grid side (or an alternating current end of the photovoltaic inverter) may require the photovoltaic inverter to increase an output power (for example, an equivalent load on the power grid side is increased, or a grid-connected power corresponding to a grid-connected standard on the power grid side is increased, or an electric power consumption power of a local load is increased), to increase the input power of the inverter circuit. If the output power of the inverter circuit is adjusted based on the excessively large adjustment step, the bus voltage may be decreased. As a result, the system discharges to the inverter circuit by using the energy storage unit, to increase the output power of the inverter circuit, or a charge power of the energy storage unit is decreased. Therefore, when the photovoltaic inverter or another controller in the photovoltaic system detects that the energy storage unit discharges to the inverter circuit by using the inverter circuit, or detects that the charge power of the energy storage unit is decreased, or detects that the bus voltage is decreased, the photovoltaic inverter or the another controller in the photovoltaic system may further adjust the inverter circuit to decrease the output power. This may cause the energy storage unit to repeatedly switch between a charge state and a discharge state, or cause a system grid-connected power to repeatedly fluctuate, or cause the bus voltage to repeatedly fluctuate, or cause the voltage conversion circuit to fail to stably work in the maximum power state. If the output power of the inverter circuit is adjusted based on an excessively small adjustment step, the system may track the maximum power point too slowly. In this case, power supply efficiency of the photovoltaic system is reduced.

In the embodiments, the controller may evaluate the capability of outputting electric energy by the voltage conversion circuit in the current time period based on the output power of the inverter circuit in the current time period and the output power of the inverter circuit in the first time period, to obtain an estimated power increment value of an appropriate magnitude, and adjust the output power of the inverter based on the estimated power increment value. In other words, the controller may obtain an estimated power increment value of an appropriate magnitude based on an output power of the inverter circuit between the current time period and the first time period, and adjust the output power of the inverter based on the estimated power increment value. This can avoid sacrificing energy storage efficiency of the energy storage unit in a process of increasing the output power of the inverter circuit by the photovoltaic system, and can also improve a speed of tracking the maximum power point by the voltage conversion circuit, improve stability of the voltage conversion circuit in a case in which the voltage conversion circuit works in a maximum power state, improve stability of the bus voltage, and improve the output power of the inverter while ensuring stable running of the inverter and safe use of a power component, and improve power supply efficiency of the photovoltaic system. A structure is simple, a method is simple, and applicability is high.

With reference to the first aspect or the first possible implementation of the first aspect, in a second possible implementation, the controller may be configured to: when the voltage conversion circuit does not work in the maximum power state, if the difference between the output power of the inverter circuit in the current time period and the output power of the inverter circuit in the first time period is less than a first threshold, set the estimated power increment value of the inverter circuit to a first power increment value.

In the embodiments, the controller may evaluate a capability of outputting electric energy by the voltage conversion circuit in the current time period based on a magnitude relationship between the first threshold and the difference between the output power of the inverter circuit in the current time period and the output power of the inverter circuit in the first time period, to obtain an estimated power increment value of an appropriate magnitude, and adjust the output power of the inverter based on the estimated power increment value. For example, when the difference between the output power in the current time period and the output power in the first time period is less than the first threshold, it is estimated that the capability of outputting electric energy by the voltage conversion circuit in the current time period is weak, so that a small estimated power increment value (for example, the first power increment value) is obtained, and the output power of the inverter is adjusted based on the estimated power increment value. That is, in the current time period, if the output power of the inverter is adjusted based on an estimated power increment value greater than the first power increment value, the charge power of the energy storage unit needs to be decreased or the energy storage unit needs to discharge for compensation. In other words, in the current time period, if the output power of the inverter is adjusted based on the first power increment value, the inverter may convert a part of direct current electric energy generated by a power supply (for example, a photovoltaic module) into alternating current electric energy, and provide the alternating current electric energy for the power grid, and there is no need to decrease the charge power of the energy storage unit or discharge the energy storage unit for compensation. Herein, the first power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period), or may be calculated in real time based on the current environment (for example, the parameter like the light intensity or the temperature). The first power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in a process of increasing the output power of the inverter circuit by the photovoltaic system, stability of the voltage conversion circuit working in the maximum power state can be improved, and power supply efficiency of the photovoltaic system can be improved. A structure is simple, a method is simple, and applicability is high.

With reference to the second possible implementation of the first aspect, in a third possible implementation, the controller may be further configured to: when the voltage conversion circuit does not work in the maximum power state, if the difference between the output power of the inverter circuit in the current time period and the output power of the inverter circuit in the first time period is greater than or equal to the first threshold, and a difference between the output power of the inverter circuit in the current time period and an output power of the inverter circuit in a second time period is less than a second threshold, set the estimated power increment value of the inverter circuit to a second power increment value, where the second time period is before the first time period, and the second power increment value is greater than the first power increment value.

In the embodiments, the controller may preliminarily evaluate the capability of receiving electric energy by the voltage conversion circuit in the current time period based on the magnitude relationship between the first threshold and the difference between the output power of the inverter circuit in the current time period and the output power of the inverter circuit in the first time period. When the difference between the output power in the current time period and the output power in the first time period is greater than or equal to the first threshold, the capability of receiving electric energy by the voltage conversion circuit (or outputting electric energy by the photovoltaic module) in the current time period is further evaluated based on a magnitude relationship between the difference between the output power of the inverter circuit in the current time period and the output power of the inverter circuit in the second time period and the second threshold, to obtain an estimated power increment value of an appropriate size, and adjust the output power of the inverter based on the estimated power increment value. For example, when the difference between the output power in the current time period and the output power in the first time period is greater than or equal to the first threshold, it is preliminarily estimated that the capability of outputting electric energy by the voltage conversion circuit in the current time period is strong, and a capability of receiving electric energy by the voltage conversion circuit (or outputting electric energy by the photovoltaic module) in the current time period may be further evaluated. When the difference between the output power of the inverter circuit in the current time period and the output power of the inverter circuit in the second time period is less than the second threshold, it is further evaluated that the capability of receiving electric energy by the voltage conversion circuit (or outputting electric energy by the photovoltaic module) in the current time period is strong, to obtain an estimated power increment value (for example, the second power increment value) greater than the first power increment value, and adjust the output power of the inverter based on the estimated power increment value.

That is, in the current time period, if the output power of the inverter is adjusted based on an estimated power increment value less than the second power increment value, the capability of receiving electric energy by the voltage conversion circuit in the current time period is not fully used, and more time needs to be spent to enable the inverter to work in the maximum power state. In other words, in the current time period, if the output power of the inverter is adjusted based on the second power increment value, the inverter can quickly work in the maximum power state while ensuring the charge power of the energy storage unit (or ensuring that the energy storage unit does not discharge), and more efficiently convert a part of the direct current electric energy generated by the power supply (for example, the photovoltaic module) into alternating current electric energy and provide the alternating current electric energy for the power grid. Herein, the second power increment value is greater than the first power increment value. The second power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period and the second time period), or may be calculated in real time based on the current second power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in the process of increasing the output power of the inverter circuit by the photovoltaic system, a speed of tracking the maximum power point by the voltage conversion circuit can be improved, stability of the voltage conversion circuit working in the maximum power state can be improved, and power supply efficiency of the photovoltaic system can be improved. A structure is simple, a method is simple, and applicability is high.

With reference to the third possible implementation of the first aspect, in a fourth possible implementation, the controller may be further configured to: when the voltage conversion circuit does not work in the maximum power state, if the difference between the output power of the inverter circuit in the current time period and the output power of the inverter circuit in the first time period is greater than or equal to the first threshold, and the difference between the output power of the inverter circuit in the current time period and the output power of the inverter circuit in the second time period is greater than or equal to the second threshold, set the estimated power increment value of the inverter circuit to a third power increment value, where the third power increment value is greater than the second power increment value.

In the embodiments, the controller may preliminarily evaluate the capability of receiving electric energy by the voltage conversion circuit in the current time period based on the magnitude relationship between the first threshold and the difference between the output power of the inverter circuit in the current time period and the output power of the inverter circuit in the first time period. When the difference between the output power in the current time period and the output power in the first time period is greater than or equal to the first threshold, the capability of receiving electric energy by the voltage conversion circuit (or outputting electric energy by the photovoltaic module) in the current time period is further evaluated based on a magnitude relationship between the difference between the output power of the inverter circuit in the current time period and the output power of the inverter circuit in the second time period and the second threshold, to obtain an estimated power increment value of an appropriate size, and adjust the output power of the inverter based on the estimated power increment value. For example, when the difference between the output power in the current time period and the output power in the first time period is greater than or equal to the first threshold, it is preliminarily estimated that the capability of outputting electric energy by the voltage conversion circuit in the current time period is strong, and a capability of receiving electric energy by the voltage conversion circuit (or outputting electric energy by the photovoltaic module) in the current time period may be further evaluated. When the difference between the output power of the inverter circuit in the current time period and the output power of the inverter circuit in the second time period is greater than or equal to the second threshold, it is further evaluated that the capability of receiving electric energy by the voltage conversion circuit (or outputting electric energy by the photovoltaic module) in the current time period is stronger, to obtain an estimated power increment value (for example, the third power increment value) greater than the second power increment value, and adjust the output power of the inverter based on the estimated power increment value.

That is, in the current time period, if the output power of the inverter is adjusted based on an estimated power increment value less than the third power increment value, the capability of receiving electric energy by the voltage conversion circuit in the current time period is not fully used, and more time needs to be spent to enable the inverter to work in the maximum power state. In other words, in the current time period, if the output power of the inverter is adjusted based on the third power increment value, the inverter can quickly work in the maximum power state while ensuring the charge power of the energy storage unit (or ensuring that the energy storage unit does not discharge), and more efficiently convert a part of the direct current electric energy generated by the power supply (for example, the photovoltaic module) into alternating current electric energy and provide the alternating current electric energy for the power grid. Herein, the third power increment value is greater than the second power increment value. The third power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period and the second time period), or may be calculated in real time based on the current environment (for example, the parameter like the light intensity or the temperature). The third power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in the process of increasing the output power of the inverter circuit by the photovoltaic system, a speed of tracking the maximum power point by the voltage conversion circuit can be further improved, stability of the voltage conversion circuit working in the maximum power state can be improved, and power supply efficiency of the photovoltaic system can be improved. A structure is simple, a method is simple, and applicability is high.

With reference to the third or the fourth possible implementation of the first aspect, in a fifth possible implementation, the controller may be configured to set the estimated power increment value of the inverter circuit to a fourth power increment value when the voltage conversion circuit switches from the maximum power state to a non-maximum power state. The fourth power increment value is less than the second power increment value. Herein, when the voltage conversion circuit switches from the maximum power state to the non-maximum power state, the controller is at a state switching moment (or time point), and the controller may first adjust the output power of the inverter based on a small estimated power increment value (for example, the fourth power increment value). That is, when the voltage conversion circuit switches from the maximum power state to the non-maximum power state, if the output power of the inverter is adjusted based on an estimated power increment value greater than the fourth power increment value, the charge power of the energy storage unit may need to be decreased or the energy storage unit may discharge for compensation. In other words, when the voltage conversion circuit switches from the maximum power state to the non-maximum power state, if the output power of the inverter is adjusted based on an estimated small power increment value (for example, the fourth power increment value), it can be ensured that the inverter converts a part of the direct current electric energy generated by the power supply (for example, the photovoltaic module) into alternating current electric energy and provides the alternating current electric energy for the power grid, and there is no need to decrease the charge power of the energy storage unit or discharge the energy storage unit for compensation. Herein, the fourth power increment value is less than the second power increment value, and may be equal to the first power increment value in some scenarios. The fourth power increment value may be preset based on the power supply parameter of the inverter, the energy storage parameter of the energy storage unit, and/or the grid-connected parameter of the power grid in the application scenario, or may be calculated based on the estimated power increment value of the inverter circuit (or may be calculated based on another parameter that can indicate the capability of outputting electric energy by the voltage conversion circuit) in a previous (for example, when the voltage conversion circuit is in the non-maximum power state last time) time period or several previous time periods (for example, the first time period and the second time period corresponding to a case in which the voltage conversion circuit is in the non-maximum power state last time), or may be calculated in real time based on the current environment (for example, the parameter like the light intensity or the temperature). The fourth power increment value herein may be a power increment value, may be a plurality of discrete power increment values, or may be a power increment interval formed including a plurality of discrete power increment values or continuous power increment values. According to the embodiments, a case in which the photovoltaic system sacrifices energy storage efficiency of the energy storage unit when the voltage conversion circuit switches from the maximum power state to the non-maximum power state can be avoided, stability of the voltage conversion circuit working in the maximum power state can be improved, and power supply efficiency of the photovoltaic system can be improved. A structure is simple, a method is simple, and applicability is high.

With reference to any one of the first aspect or the possible implementations of the first aspect, in a sixth possible implementation, the controller may be further configured to obtain a running status signal of the voltage conversion circuit. The running status signal may indicate whether the voltage conversion circuit works in a maximum power state. Herein, the voltage conversion circuit (or the inverter circuit) in the photovoltaic inverter may output the running status signal based on a current working status of the voltage conversion circuit. For example, when a control loop (or another control circuit) that takes effect (or plays a main role) in the voltage conversion circuit or the inverter circuit is a non-limiting power control loop, it may be determined that the voltage conversion circuit currently works in the maximum power state, and the photovoltaic inverter may output a running status signal indicating that the voltage conversion circuit is in the maximum power state.

With reference to any one of the first aspect or the possible implementations of the first aspect, in a seventh possible implementation, the controller may be configured to set the estimated power increment value of the inverter circuit to zero when the voltage conversion circuit works in the maximum power state. According to the embodiments, stability of the voltage conversion circuit working in the maximum power state can be improved, and power supply efficiency of the photovoltaic system can be improved. A structure is simple, a method is simple, and applicability is high.

With reference to any one of the first aspect or the possible implementations of the first aspect, in an eighth possible implementation, the controller may further output a power adjustment signal to the inverter circuit and/or the voltage conversion circuit based on the estimated power increment value, and control the output power of the inverter circuit by using the power adjustment signal. Herein, the controller may further generate the power adjustment signal based on the estimated power increment value (for example, generate a modulation signal based on the estimated power increment value as the power adjustment signal), and control the inverter circuit and/or the voltage conversion circuit (for example, control the inverter circuit and/or a switching transistor in the voltage conversion circuit) by using the power adjustment signal, to adjust the output power of the inverter circuit, so as to correspondingly adjust the input power of the inverter circuit. A structure is simple, and a control method is simple.

According to a second aspect, the embodiments provide a photovoltaic system. The photovoltaic system may include a plurality of photovoltaic inverters according to any one of the first aspect or the possible implementations of the first aspect. One end of each of the plurality of photovoltaic inverters herein may be configured to connect to a photovoltaic module. The other ends of the plurality of photovoltaic inverters may be configured to connect to a power grid after being connected in parallel. The plurality of photovoltaic inverters reuses one controller or several controllers, or controllers in the plurality of photovoltaic inverters are integrated into one control module. According to the embodiments, each of the controllers (or the control module) in the plurality of photovoltaic inverters may correspondingly obtain at least one appropriate estimated power increment value based on an output power of at least one inverter circuit between a current time period and a first time period, and adjust the output power of the at least one inverter circuit based on the corresponding estimated power increment value. In this way, energy storage efficiency of an energy storage unit can be avoided from being sacrificed in a process of increasing the output power of the inverter circuit by the photovoltaic system, a speed of tracking a maximum power point by a voltage conversion circuit can be improved, stability of the voltage conversion circuit working in a maximum power state can be improved, and power supply efficiency of the photovoltaic system can be improved. A structure is simple, a method is simple, and applicability is high.

According to a third aspect, the embodiments provide a control method of a photovoltaic inverter. The control method is applicable to a photovoltaic inverter, and the photovoltaic inverter includes a voltage conversion circuit, an inverter circuit, and a controller. Herein, one end of the voltage conversion circuit may be configured to connect to a photovoltaic module, the other end of the voltage conversion circuit may be configured to connect to one end of the inverter circuit, the other end of the inverter circuit may be configured to connect to a load and a power grid, and the inverter circuit and the power grid are connected to a grid-connected point. The voltage conversion circuit herein may be configured to output, to the inverter circuit, a direct current input by the photovoltaic module. The inverter circuit herein is configured to: receive the direct current output by the voltage conversion circuit, convert the received direct current output by the voltage conversion circuit into an alternating current, and output the alternating current to the power grid. The method includes:

increasing, based on an output power of the inverter circuit in the current time period and an output power of the inverter circuit in the first time period, the output power of the inverter circuit when the voltage conversion circuit does not work in a maximum power state. Herein, an increase of the output power of the inverter circuit may be represented as an estimated power increment value of the inverter circuit, and the estimated power increment value of the inverter circuit is in direct proportion to a difference between the output power in the current time period and the output power in the first time period. Herein, being in direct proportion may be a linear function relationship, or may be a positive correlation relationship of a non-linear function. For example, if the difference between the output power of the inverter circuit in the current time period and the output power of the inverter circuit in the first time period is x, the estimated power increment value $\Delta P$ of the inverter circuit may be calculated according to a formula $\Delta P = k \times x + A$, where k and A are coefficients or parameters designed based on a specific application scenario. The first time period is before the current time period.

In the embodiments, the photovoltaic module (or a photovoltaic string including a plurality of photovoltaic modules) may be used as a power supply to connect to the power grid by using the photovoltaic inverter, and the photovoltaic inverter may convert direct current electric energy provided by the photovoltaic module into alternating current electric energy, and provide the alternating current electric energy for the power grid. Herein, the photovoltaic inverter may include the voltage conversion circuit and the inverter circuit. The voltage conversion circuit may convert an output voltage of the photovoltaic module into a direct current voltage that matches the inverter circuit, and transmit the direct current voltage to the inverter circuit. The inverter circuit may convert direct current electric energy into alternating current electric energy, so that electric energy output by the inverter circuit can adapt to an alternating current power grid. In a photovoltaic power supply scenario, to maximize use of electric energy generated by the photovoltaic module, the photovoltaic inverter may supply power by using an MPPT technology, that is, control an output power of the inverter, to enable the photovoltaic module to work at a maximum power point, so that the inverter can output electric energy to the power grid at a maximum output power. However, in some cases, for example, if an output power required by the power grid (including a load) is low, the output power of the inverter also needs to be controlled to be in a non-MPPT state, that is, the inverter does not work in a maximum power state. In the non-MPPT state, the output power of the inverter may need to be increased according to a scheduling instruction. However, the maximum output power of the inverter is unknown when the inverter is in the non-MPPT state. In this case, the output power of the inverter is increased too much. As a result, the output power of the inverter exceeds a power output capability of the inverter. This may cause system breakdown.

In the embodiments, a concept of the estimated power increment value is introduced. The controller may adjust the output power of the inverter based on the estimated power increment value. It should be understood that the output power of the inverter is determined by the output power of the inverter circuit in the inverter, and the output power of the inverter circuit is limited by an output power of the previous-stage voltage conversion circuit. In other words, a power output capability of the previous-stage voltage conversion circuit needs to be considered for the increase of the output power of the inverter, and the estimated power increment value herein may be obtained based on the output power of the inverter circuit in the current time period and the output power of the inverter circuit in the first time period. It may be understood that the controller may evaluate a capability of outputting electric energy by the voltage conversion circuit in the current time period based on the output power of the inverter circuit in the current time period and the output power of the inverter circuit in the first time period, to obtain an estimated power increment value of an appropriate magnitude, and adjust the output power of the inverter based on the estimated power increment value. In other words, the controller may obtain an estimated power increment value of an appropriate magnitude based on an output power of the inverter circuit between the current time period and the first time period, and adjust the output power of the inverter based on the estimated power increment value. This can avoid a decrease of a bus voltage that is caused in a process of increasing the output power of the inverter circuit by the photovoltaic system based on an excessively large step, improve stability of the bus voltage, stably increase the output power of the inverter while ensuring stable operation of the inverter and safe use of a power component, and improve power supply efficiency of the photovoltaic system.

With reference to the third aspect, in a first possible implementation, the other end of the voltage conversion circuit may be configured to connect to an energy storage unit, and is configured to output, to the energy storage unit, a direct current input by the photovoltaic module. The inverter circuit herein may be configured to: receive the direct current output by the energy storage unit, convert the received direct current output by the energy storage unit into an alternating current, and output the alternating current to the power grid.

Herein, the photovoltaic inverter may further be connected to the energy storage unit (for example, connected to the energy storage unit by using the voltage conversion circuit), to store, in the energy storage unit, a part of direct current electric energy output by the photovoltaic module, convert the other part of the direct current electric energy output by the photovoltaic module into alternating current electric energy, and transmit the alternating current electric energy to the power grid. In some application scenarios, the photovoltaic inverter (for example, the inverter circuit in the photovoltaic inverter) may further be connected to the power grid at the grid-connected point after being connected to a local load. It may be understood that, when the voltage conversion circuit does not work in the maximum power state, the power grid side (or an alternating current end of the photovoltaic inverter) may require the inverter circuit to increase an output power (for example, an equivalent load on the power grid side is increased, or a grid-connected power corresponding to a grid-connected standard on the power grid side is increased, or an electric power consumption power of the local load is increased), to increase an input power of the inverter circuit. If the output power of the inverter circuit is adjusted based on the excessively large adjustment step, the bus voltage may be decreased. As a result, the system discharges to the inverter circuit by using the energy storage unit, to increase the output power of the inverter circuit, or a charge power of the energy storage unit is decreased. Therefore, when the photovoltaic inverter or another controller in the photovoltaic system detects that the energy storage unit discharges to the inverter circuit by using the inverter circuit, or detects that the charge power of the energy storage unit is decreased, or detects that the bus voltage is decreased, the photovoltaic inverter or the another controller in the photovoltaic system may further adjust the inverter circuit to decrease the output power. This may cause the energy storage unit to repeatedly switch between a charge state and a discharge state, or cause a system grid-connected power to repeatedly fluctuate, or cause the bus voltage to repeatedly fluctuate, or cause the voltage conversion circuit to fail to stably work in the maximum power state. If the output power of the inverter circuit is adjusted based on an excessively small adjustment step, the system may track the maximum power point too slowly. In this case, power supply efficiency of the photovoltaic system is reduced.

In the embodiments, the controller may evaluate the capability of outputting electric energy by the voltage conversion circuit in the current time period based on the output power of the inverter circuit in the current time period and the output power of the inverter circuit in the first time period, to obtain an estimated power increment value of an appropriate magnitude, and adjust the output power of the inverter based on the estimated power increment value. In other words, the controller may obtain an estimated power increment value of an appropriate magnitude based on an output power of the inverter circuit between the current time period and the first time period, and adjust the output power of the inverter based on the estimated power increment value. This can avoid sacrificing energy storage efficiency of the energy storage unit in a process of increasing the output power of the inverter circuit by the photovoltaic system, and can also improve a speed of tracking the maximum power point by the voltage conversion circuit, improve stability of the voltage conversion circuit in a case in which the voltage conversion circuit works in a maximum power state, improve stability of the bus voltage, and improve the output power of the inverter while ensuring stable running of the inverter and safe use of a power component, and improve power supply efficiency of the photovoltaic system. A structure is simple, a method is simple, and applicability is high.

With reference to the third aspect or the first possible implementation of the third aspect, in a second possible implementation, the increasing, based on an output power of the inverter circuit in the current time period and an output power of the inverter circuit in the first time period, the output power of the inverter circuit when the voltage conversion circuit does not work in a maximum power state includes:

when the voltage conversion circuit does not work in the maximum power state, if the difference between the output power of the inverter circuit in the current time period and the output power of the inverter circuit in the first time period is less than a first threshold, setting the estimated power increment value of the inverter circuit to a first power increment value.

In the embodiments, the controller may evaluate a capability of outputting electric energy by the voltage conversion circuit in the current time period based on a magnitude relationship between the first threshold and the difference between the output power of the inverter circuit in the current time period and the output power of the inverter circuit in the first time period, to obtain an estimated power increment value of an appropriate magnitude, and adjust the output power of the inverter based on the estimated power increment value. For example, when the difference between the output power in the current time period and the output power in the first time period is less than the first threshold, it is estimated that the capability of outputting electric energy by the voltage conversion circuit in the current time period is weak, so that a small estimated power increment value (for example, the first power increment value) is obtained, and the output power of the inverter is adjusted based on the estimated power increment value. That is, in the current time period, if the output power of the inverter is adjusted based on an estimated power increment value greater than the first power increment value, the charge power of the energy storage unit needs to be decreased or the energy storage unit needs to discharge for compensation. In other words, in the current time period, if the output power of the inverter is adjusted based on the first power increment value, the inverter may convert a part of direct current electric energy generated by a power supply (for example, a photovoltaic module) into alternating current electric energy, and provide the alternating current electric energy for the power grid, and there is no need to decrease the charge power of the energy storage unit or discharge the energy storage unit for compensation. Herein, the first power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period), or may be calculated in real time based on a current environment (for example, a parameter like a light intensity or a temperature). The first power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in a process of increasing the output power of the inverter circuit by the photovoltaic system, stability of the voltage conversion circuit working in the maximum power state can be improved, and power supply efficiency of the photovoltaic system can be improved. A structure is simple, a method is simple, and applicability is high.

With reference to the second possible implementation of the third aspect, in a third possible implementation, the increasing, based on an output power of the inverter circuit in the current time period and an output power of the inverter circuit in the first time period, the output power of the inverter circuit when the voltage conversion circuit does not work in a maximum power state includes:

when the voltage conversion circuit does not work in the maximum power state, if the difference between the output power of the inverter circuit in the current time period and the output power of the inverter circuit in the first time period is greater than or equal to the first threshold, and a difference between the output power of the inverter circuit in the current time period and an output power of the inverter circuit in a second time period is less than a second threshold, setting the estimated power increment value of the inverter circuit to a second power increment value, where the second time period is before the first time period, and the second power increment value is greater than the first power increment value.

In the embodiments, the controller may preliminarily evaluate the capability of receiving electric energy by the voltage conversion circuit in the current time period based on the magnitude relationship between the first threshold and the difference between the output power of the inverter circuit in the current time period and the output power of the inverter circuit in the first time period. When the difference between the output power in the current time period and the output power in the first time period is greater than or equal to the first threshold, the capability of receiving electric energy by the voltage conversion circuit (or outputting electric energy by the photovoltaic module) in the current time period is further evaluated based on a magnitude relationship between the difference between the output power of the inverter circuit in the current time period and the output power of the inverter circuit in the second time period and the second threshold, to obtain an estimated power increment value of an appropriate size, and adjust the output power of the inverter based on the estimated power increment value. For example, when the difference between the output power in the current time period and the output power in the first time period is greater than or equal to the first threshold, it is preliminarily estimated that the capability of outputting electric energy by the voltage conversion circuit in the current time period is strong, and a capability of receiving electric energy by the voltage conversion circuit (or outputting electric energy by the photovoltaic module) in the current time period may be further evaluated. When the difference between the output power of the inverter circuit in the current time period and the output power of the inverter circuit in the second time period is less than the second threshold, it is further evaluated that the capability of receiving electric energy by the voltage conversion circuit (or outputting electric energy by the photovoltaic module) in the current time period is strong, to obtain an estimated power increment value (for example, the second power increment value) greater than the first power increment value, and adjust the output power of the inverter based on the estimated power increment value.

That is, in the current time period, if the output power of the inverter is adjusted based on an estimated power increment value less than the second power increment value, the capability of receiving electric energy by the voltage conversion circuit in the current time period is not fully used, and more time needs to be spent to enable the inverter to work in the maximum power state. In other words, in the current time period, if the output power of the inverter is adjusted based on the second power increment value, the inverter can quickly work in the maximum power state while ensuring the charge power of the energy storage unit (or ensuring that the energy storage unit does not discharge), and more efficiently convert a part of the direct current electric energy generated by the power supply (for example, the photovoltaic module) into alternating current electric energy and provide the alternating current electric energy for the power grid. Herein, the second power increment value is greater than the first power increment value. The second power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period and the second time period), or may be calculated in real time based on the current second power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in the process of increasing the output power of the inverter circuit by the photovoltaic system, a speed of tracking the maximum power point by the voltage conversion circuit can be improved, stability of the voltage conversion circuit working in the maximum power state can be improved, and power supply efficiency of the photovoltaic system can be improved. A structure is simple, a method is simple, and applicability is high.

With reference to the third possible implementation of the third aspect, in a fourth possible implementation, the increasing, based on an output power of the inverter circuit in the current time period and an output power of the inverter circuit in the first time period, the output power of the inverter circuit when the voltage conversion circuit does not work in a maximum power state includes:

when the voltage conversion circuit does not work in the maximum power state, if the difference between the output power of the inverter circuit in the current time period and the output power of the inverter circuit in the first time period is greater than or equal to the first threshold, and the difference between the output power of the inverter circuit in the current time period and the output power of the inverter circuit in the second time period is greater than or equal to the second threshold, setting the estimated power increment value of the inverter circuit to a third power increment value, where the third power increment value is greater than the second power increment value.

In the embodiments, the controller may preliminarily evaluate the capability of receiving electric energy by the voltage conversion circuit in the current time period based on the magnitude relationship between the first threshold and the difference between the output power of the inverter circuit in the current time period and the output power of the inverter circuit in the first time period. When the difference between the output power in the current time period and the output power in the first time period is greater than or equal to the first threshold, the capability of receiving electric energy by the voltage conversion circuit (or outputting electric energy by the photovoltaic module) in the current time period is further evaluated based on a magnitude relationship between the difference between the output power of the inverter circuit in the current time period and the output power of the inverter circuit in the second time period and the second threshold, to obtain an estimated power increment value of an appropriate size, and adjust the output power of the inverter based on the estimated power increment value. For example, when the difference between the output power in the current time period and the output power in the first time period is greater than or equal to the first threshold, it is preliminarily estimated that the capability of outputting electric energy by the voltage conversion circuit in the current time period is strong, and a capability of receiving electric energy by the voltage conversion circuit (or outputting electric energy by the photovoltaic module) in the current time period may be further evaluated. When the difference between the output power of the inverter circuit in the current time period and the output power of the inverter circuit in the second time period is greater than or equal to the second threshold, it is further evaluated that the capability of receiving electric energy by the voltage conversion circuit (or outputting electric energy by the photovoltaic module) in the current time period is stronger, to obtain an estimated power increment value (for example, the third power increment value) greater than the second power increment value, and adjust the output power of the inverter based on the estimated power increment value.

That is, in the current time period, if the output power of the inverter is adjusted based on an estimated power increment value less than the third power increment value, the capability of receiving electric energy by the voltage conversion circuit in the current time period is not fully used, and more time needs to be spent to enable the inverter to work in the maximum power state. In other words, in the current time period, if the output power of the inverter is adjusted based on the third power increment value, the inverter can quickly work in the maximum power state while ensuring the charge power of the energy storage unit (or ensuring that the energy storage unit does not discharge), and more efficiently convert a part of the direct current electric energy generated by the power supply (for example, the photovoltaic module) into alternating current electric energy and provide the alternating current electric energy for the power grid. Herein, the third power increment value is greater than the second power increment value. The third power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period and the second time period), or may be calculated in real time based on the current environment (for example, the parameter like the light intensity or the temperature). The third power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in the process of increasing the output power of the inverter circuit by the photovoltaic system, a speed of tracking the maximum power point by the voltage conversion circuit can be further improved, stability of the voltage conversion circuit working in the maximum power state can be improved, and power supply efficiency of the photovoltaic system can be improved. A structure is simple, a method is simple, and applicability is high.

With reference to any one of the third aspect or the possible implementations of the third aspect, in a fifth possible implementation, the method further includes:

setting the estimated power increment value of the inverter circuit to a fourth power increment value when the voltage conversion circuit switches from the maximum power state to a non-maximum power state, where the fourth power increment value is less than the second power increment value.

Herein, when the voltage conversion circuit switches from the maximum power state to the non-maximum power state, the controller may first adjust the output power of the inverter based on a small estimated power increment value (for example, the fourth power increment value ΔP4). That is, when the voltage conversion circuit switches from the maximum power state to the non-maximum power state, if the output power of the inverter is adjusted based on an estimated power increment value greater than the fourth power increment value, the charge power of the energy storage unit may need to be decreased or the energy storage unit may discharge for compensation. In other words, when the voltage conversion circuit switches from the maximum power state to the non-maximum power state, if the output power of the inverter is adjusted based on an estimated small power increment value (for example, the fourth power increment value), it can be ensured that the inverter converts a part of the direct current electric energy generated by the power supply (for example, the photovoltaic module) into alternating current electric energy and provides the alternating current electric energy for the power grid, and there is no need to decrease the charge power of the energy storage unit or discharge the energy storage unit for compensation. Herein, the fourth power increment value is less than the second power increment value, and may be equal to the first power increment value in some scenarios. The fourth power increment value may be preset based on the power supply parameter of the inverter, the energy storage parameter of the energy storage unit, and/or the grid-connected parameter of the power grid in the application scenario, or may be calculated based on the estimated power increment value of the inverter circuit (or may be calculated based on another parameter that can indicate the capability of outputting electric energy by the voltage conversion circuit) in a previous (for example, when the voltage conversion circuit is in the non-maximum power state last time) time period or several previous time periods (for example, the first time period and the second time period corresponding to a case in which the voltage conversion circuit is in the non-maximum power state last time), or may be calculated in real time based on the current environment (for example, the parameter like the light intensity or the temperature). The fourth power increment value herein may be a power increment value, may be a plurality of discrete power increment values, or may be a power increment interval formed including a plurality of discrete power increment values or continuous power increment values. According to the embodiments, a case in which the photovoltaic system sacrifices energy storage efficiency of the energy storage unit when the voltage conversion circuit switches from the maximum power state to the non-maximum power state can be avoided, stability of the voltage conversion circuit working in the maximum power state can be improved, and power supply efficiency of the photovoltaic system can be improved. A structure is simple, a method is simple, and applicability is high.

With reference to any one of the third aspect or the possible implementations of the third aspect, in a sixth possible implementation, the method further includes:

setting the estimated power increment value of the inverter circuit to zero when the voltage conversion circuit works in the maximum power state. According to the embodiments, stability of the voltage conversion circuit working in the maximum power state can be improved, and power supply efficiency of the photovoltaic system can be improved. A structure is simple, a method is simple, and applicability is high.

With reference to any one of the third aspect or the possible implementations of the third aspect, in a seventh possible implementation, the method further includes:

outputting a power adjustment signal the voltage conversion circuit based on the estimated power increment value, and controlling the output power of the inverter circuit by using the power adjustment signal. Herein, the controller may further generate the power adjustment signal based on the estimated power increment value (for example, generate a modulation signal based on the estimated power increment value as the power adjustment signal), and control the inverter circuit and/or the voltage conversion circuit (for example, control the inverter circuit and/or a switching transistor in the voltage conversion circuit) by using the power adjustment signal, to adjust the output power of the inverter circuit, so as to correspondingly adjust the input power of the inverter circuit. A structure is simple, and a control method is simple.

BRIEF DESCRIPTION OF DRAWINGS

FIG. 7 is a schematic flowchart of a control method according to an embodiment; and FIG. 8 is another schematic flowchart of a control method according to an embodiment.

DETAILED DESCRIPTION OF EMBODIMENTS

A photovoltaic inverter provided in the embodiments is used in a plurality of application fields, such as the field of power generation using renewable energy, the field of peak shaving and frequency modulation in conventional power generation, and the field of supplying power to an important device. This may be determined based on an actual application scenario, and is not limited herein. A photovoltaic system provided in the embodiments is applicable to different scenarios such as a large photovoltaic power station, industrial and commercial photovoltaic power generation, and household photovoltaic power generation. This is not limited herein. The following uses an application scenario in which an inverter in a photovoltaic power supply environment is controlled as an example for description. Details are not described below again.

Figure 1:
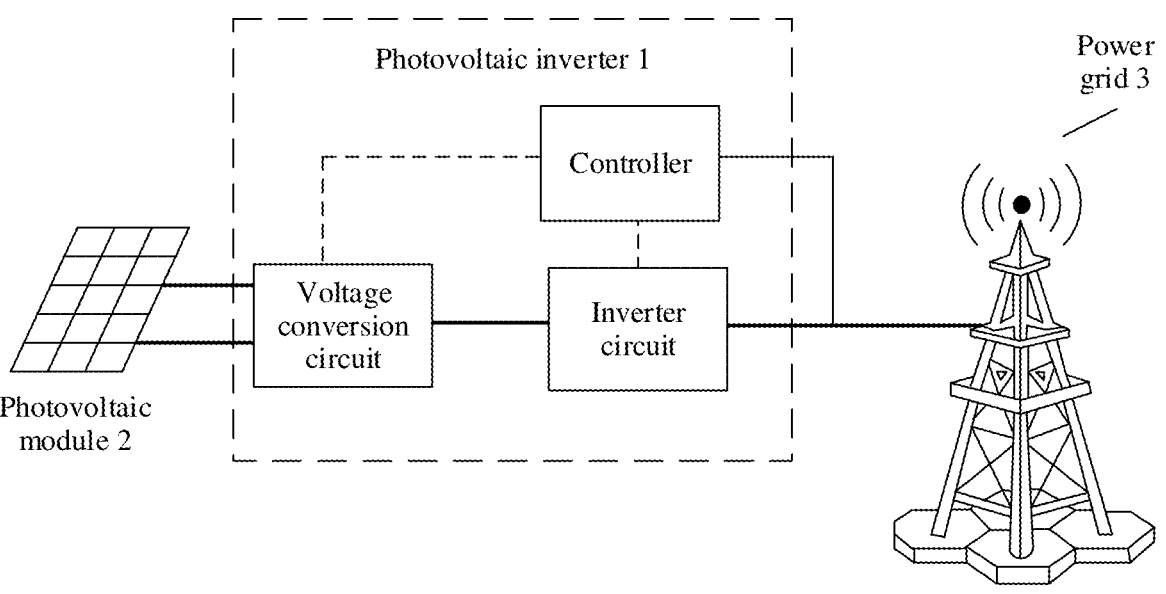
FIG. 1 is a schematic diagram of an application scenario of a photovoltaic inverter according to an embodiment.

FIG. 1 is a schematic diagram of an application scenario of a photovoltaic inverter according to an embodiment. In a photovoltaic power supply system, as shown in FIG. 1, a power supply system includes a photovoltaic inverter 1, a power supply (such as a photovoltaic module 2 or a photovoltaic string including a plurality of photovoltaic modules), and a power grid 3. The photovoltaic inverter 1 includes a voltage conversion circuit, an inverter circuit, and a controller. Herein, one end of the voltage conversion circuit may be configured to connect to the photovoltaic module 2, the other end of the voltage conversion circuit may be configured to connect to one end of the inverter circuit, the other end of the inverter circuit may be configured to connect to the power grid 3, and the inverter circuit and the power grid 3 are connected to a grid-connected point. The controller may be connected (for example, through a communication connection or an electrical connection) to the grid-connected point, the inverter circuit, and/or the voltage conversion circuit (as shown by dashed lines in the figure). In some implementations, the photovoltaic inverter 1 may convert direct current electric energy provided by the photovoltaic module 2 into alternating current electric energy, and provide the alternating current electric energy to the power grid 3. Herein, the photovoltaic inverter 1 may include the voltage conversion circuit and the inverter circuit. The voltage conversion circuit may output, to the inverter circuit, a direct current input by the photovoltaic module 2. The inverter circuit may receive the direct current output by the voltage conversion circuit, convert the received direct current output by the voltage conversion circuit into an alternating current, and output the alternating current to the power grid 3. It may be understood that the photovoltaic module 2 (or the photovoltaic string including the plurality of photovoltaic modules, or another direct current photovoltaic power supply) provided in the embodiments is applicable to an application scenario of supplying power to a plurality of types of electrical devices, for example, supplying power to a base station device in a remote area without a mains supply or with a poor mains supply, or supplying power to a household device (for example, a refrigerator or an air conditioner). This may be determined based on an actual application scenario, and is not limited herein. Further, it may be understood that the power grid 3 in FIG. 1 may include an electrical device or an electric transmission device, for example, a transmission line, an electric transfer station, a communication base station, or a household device. In a photovoltaic power supply scenario, to maximize use of electric energy generated by a photovoltaic module, a photovoltaic inverter may supply power by using a maximum power point tracking (MPPT) technology, that is, control an output power of an inverter, to enable the photovoltaic module to work at a maximum power point, so that the inverter can output electric energy to a power grid at a maximum output power. However, in some cases, for example, if an output power required by the power grid (including a load) is low, the output power of the inverter also needs to be controlled to be in a non-MPPT state, that is, the inverter does not work in a maximum power state. In the non-MPPT state, the output power of the inverter may need to be increased according to a scheduling instruction. However, the maximum output power of the inverter is unknown when the inverter is in the non-MPPT state. In this case, the output power of the inverter is increased too much. As a result, the output power of the inverter exceeds a power output capability of the inverter. This may cause system breakdown.

The controller herein may be configured to increase, based on an output power of the inverter circuit in a current time period and an output power of the inverter circuit in a first time period, an output power of the inverter circuit when the voltage conversion circuit does not work in a maximum power state. Herein, an increase of the output power of the inverter circuit may be referred to as an estimated power increment value of the inverter circuit, and the estimated power increment value of the inverter circuit is in direct proportion to a difference between the output power in the current time period and the output power in the first time period. Herein, being in direct proportion may be a linear function relationship, or may be a positive correlation relationship of a non-linear function. For example, if the difference between the output power of the inverter circuit in the current time period and the output power of the inverter circuit in the first time period is x, the estimated power increment value $\Delta P$ of the inverter circuit may be calculated according to a formula $\Delta P = k \times x + A$, where k and A are coefficients or parameters designed based on a specific application scenario. The first time period is before the current time period.

In the embodiments, a concept of the estimated power increment value is introduced. The controller may adjust the output power of the inverter circuit in the photovoltaic inverter 1 based on the estimated power increment value. It should be understood that an output power of the photovoltaic inverter 1 is determined by the output power of the inverter circuit in the photovoltaic inverter 1, and the output power of the inverter circuit is limited by an output power of the previous-stage voltage conversion circuit. In other words, a power output capability of the previous-stage voltage conversion circuit needs to be considered for the increase of the output power of the inverter, and the estimated power increment value herein may be obtained based on the output power of the inverter circuit in the current time period and the output power of the inverter circuit in the first time period. It may be understood that the controller may evaluate a capability of outputting electric energy by the voltage conversion circuit in the current time period based on the output power of the inverter circuit in the current time period and the output power of the inverter circuit in the first time period, to obtain an estimated power increment value of an appropriate magnitude, and adjust the output power of the inverter based on the estimated power increment value. In other words, the controller may obtain an estimated power increment value of an appropriate magnitude based on an output power of the inverter circuit between the current time period and the first time period, and adjust the output power of the inverter based on the estimated power increment value. This can avoid a decrease of a bus voltage that is caused in a process of increasing the output power of the inverter circuit by the photovoltaic system based on an excessively large step, improve stability of the bus voltage, stably increase the output power of the inverter while ensuring stable operation of the inverter and safe use of a power component, and improve power supply efficiency of the photovoltaic system.

Figure 2:
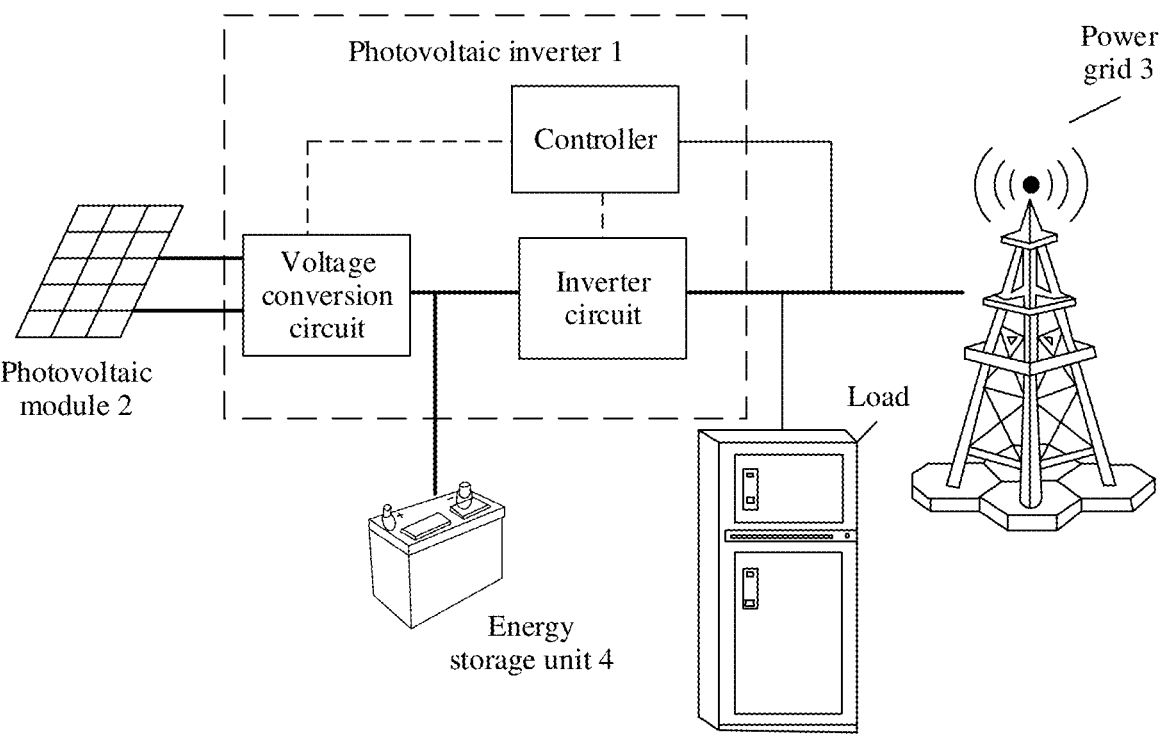
FIG. 2 is a schematic diagram of another application scenario of a photovoltaic inverter according to an embodiment.

In some application scenarios, FIG. 2 is a schematic diagram of another application scenario of the photovoltaic inverter according to an embodiment. As shown in FIG. 2, the other end of the voltage conversion circuit in the photovoltaic inverter 1 may be configured to connect to an energy storage unit 4, and is configured to output, to the energy storage unit 4, a direct current input by the photovoltaic module 2. The inverter circuit herein may be configured to: receive the direct current output by the energy storage unit 4, convert the received direct current output by the energy storage unit 4 into an alternating current, and output the alternating current to a power grid.

Refer to FIG. 2 again. In some application scenarios, the photovoltaic inverter 1 (for example, the inverter circuit in the photovoltaic inverter 1) may further be connected to the power grid at a grid-connected point after being connected to a local load. The local load herein may further include a load (an electrical apparatus or an electric power transmission apparatus) connected between the grid-connected point and the inverter circuit, for example, a motor and a rectifier device. In a photovoltaic power supply scenario, to maximize use of electric energy generated by a photovoltaic module, a photovoltaic inverter may supply power by using a maximum power point tracking (MPPT) technology, that is, control an input power (or output power) of an inverter, to enable the photovoltaic module to work at a maximum power point, so that the inverter can output electric energy to the power grid at a maximum output power. However, in some cases, for example, if an output power required by the power grid (including the load) is low, the output power of the inverter also needs to be controlled to be in a non-MPPT state, that is, the inverter does not work in a maximum power state. In the non-MPPT state, the output power of the inverter may need to be increased according to a scheduling instruction. However, the maximum output power of the inverter is unknown when the inverter is in the non-MPPT state. In this case, the output power of the inverter is increased too much. As a result, the output power of the inverter exceeds a power output capability of the inverter. This may cause system breakdown.

It may be understood that, when the photovoltaic inverter 1 does not work in a maximum power state, the power grid 3 side (or an alternating current end of the photovoltaic inverter 1) may require the inverter circuit to increase an output power (for example, an equivalent load on the power grid 3 side is increased, or a grid-connected power corresponding to a grid-connected standard on the power grid 3 side is increased, or an electric power consumption power of the local load is increased), to increase an input power of the photovoltaic inverter 1. If an output power of the photovoltaic inverter 1 is adjusted based on an excessively large adjustment step, a bus voltage may be decreased. As a result, the system discharges to the inverter circuit by using the energy storage unit 4, to increase an output power of the inverter circuit, or a charge power of the energy storage unit 4 is decreased. Therefore, when the photovoltaic inverter 1 or another controller in the photovoltaic system detects that the energy storage unit 4 discharges to the power grid 3 side by using the inverter circuit, or detects that the charge power of the energy storage unit 4 is decreased, or detects that the bus voltage is decreased, the photovoltaic inverter 1 or the another controller in the photovoltaic system may further adjust the inverter circuit to decrease the output power. This may cause the energy storage unit 4 to repeatedly switch between a charge state and a discharge state, or cause a system grid-connected power to repeatedly fluctuate, or cause the bus voltage to repeatedly fluctuate, or cause the voltage conversion circuit to fail to stably work in the maximum power state. If the output power of the inverter circuit is adjusted based on an excessively small adjustment step, the system may track the maximum power point too slowly. In this case, power supply efficiency of the photovoltaic system is reduced.

In the embodiments, the controller may evaluate a capability of outputting electric energy by the voltage conversion circuit in a current time period based on an output power of the inverter circuit in the current time period and an output power of the inverter circuit in a first time period, to obtain an estimated power increment value of an appropriate magnitude, and adjust the output power of the inverter based on the estimated power increment value. In other words, the controller may obtain an estimated power increment value of an appropriate magnitude based on an output power of the inverter circuit between the current time period and the first time period, and adjust the output power of the inverter based on the estimated power increment value. This can avoid sacrificing energy storage efficiency of the energy storage unit in a process of increasing the output power of the inverter circuit by the photovoltaic system, and can also improve a speed of tracking the maximum power point by the voltage conversion circuit, improve stability of the voltage conversion circuit in a case in which the voltage conversion circuit works in a maximum power state, improve stability of the bus voltage, improve the output power of the inverter while ensuring stable running of the inverter and safe use of a power component, and improve power supply efficiency of the photovoltaic system. A structure is simple, a method is simple, and applicability is high. The following uses examples to describe the photovoltaic inverter provided in the embodiments and a working principle of the photovoltaic inverter with reference to FIG. 3 to FIG. 8.

Figures 3, 4:
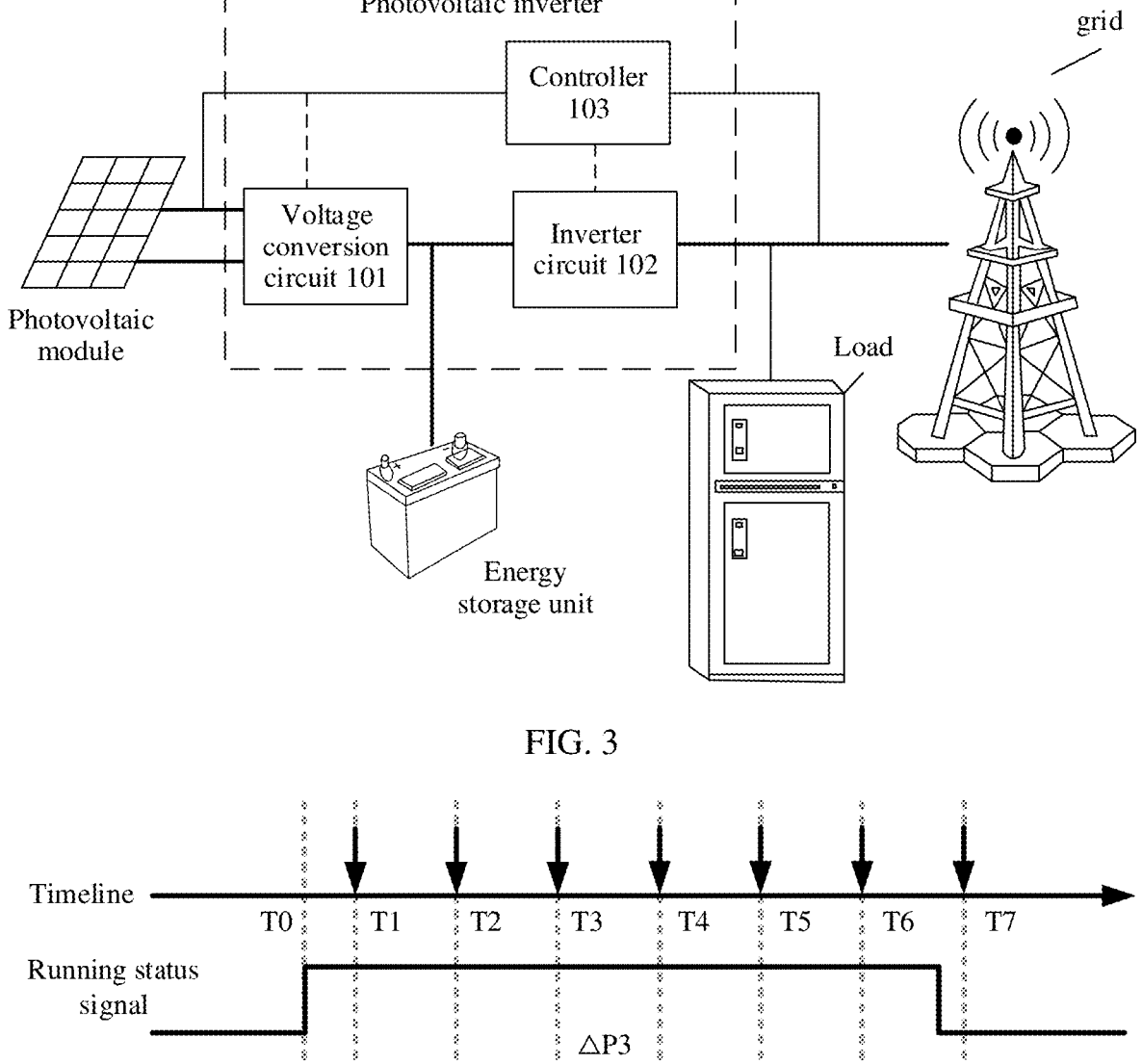
FIG. 3 is a schematic diagram of a structure of a photovoltaic inverter according to an embodiment.
FIG. 4 is a schematic diagram of a waveform of an estimated power increment value of an inverter circuit according to an embodiment.

In some implementations, FIG. 3 is a schematic diagram of a structure of a photovoltaic inverter according to an embodiment. As shown in FIG. 3, the photovoltaic inverter includes a voltage conversion circuit 101, an inverter circuit 102, and a controller 103. Herein, one end of the voltage conversion circuit 101 may be configured to connect to a photovoltaic module, the other end of the voltage conversion circuit 101 may be configured to connect to an energy storage unit and one end of the inverter circuit 102, the other end of the inverter circuit 102 may be configured to connect to a power grid, and the inverter circuit 102 and the power grid are connected to a grid-connected point. The controller 103 herein may be configured to increase, based on an output power of the inverter circuit in a current time period and an output power of the inverter circuit in a first time period, an output power of the inverter circuit when the voltage conversion circuit does not work in a maximum power state. Herein, an increase of the output power of the inverter circuit may be referred to as an estimated power increment value of the inverter circuit, and the estimated power increment value of the inverter circuit is in direct proportion to a difference between the output power in the current time period and the output power in the first time period. The first time period is before the current time period.

FIG. 4 is a schematic diagram of a waveform of the estimated power increment value of the inverter circuit according to an embodiment. A time axis shown in FIG. 4 is used as an example. The current time period may be a time period (or a moment) in which the controller 103 performs adjustment (or detection, control, or the like) on the output power of the inverter circuit this time. For example, the current time period may be a time period between Tn and Tn+1 or a moment Tn+1 (where n is a natural number). The first time period may be a time period (or a moment) in which the controller 103 performs adjustment (or detection, control, or the like) on the output power of the inverter circuit last time (or previous time) or several times before (or several previous times). For example, the first time period may be a time period between Tm and Tm+1 or a moment Tm+1 (where m is a natural number and m is less than or equal to n). It may be understood that the first time period herein may be set to any time period (or moment) before the current time period based on an application scenario, and does not necessarily need to be adjacent to the current time period. Herein, an output power of the inverter circuit in a time period (for example, the current time period or the first time period) may be an average output power (or a power value that can indicate a capability of outputting electric energy by the voltage conversion circuit, for example, a maximum/minimum output power or a weighted output power) in the time period, or may be an instantaneous output power at a specific moment (for example, a start moment, an end moment, or a sampling moment) in the time period, or may be an average output power (or a power value that can indicate a capability of outputting electric energy by the voltage conversion circuit, for example, a maximum/minimum output power or a weighted output power) at several moments (for example, a plurality of sampling moments) in the time period.

In some implementations, the controller 103 may be further configured to obtain a running status signal of the voltage conversion circuit 101. The running status signal may indicate whether the voltage conversion circuit works in a maximum power state. Herein, the voltage conversion circuit 101 (or the inverter circuit 102) in the photovoltaic inverter may output the running status signal based on a current working status of the voltage conversion circuit 101. For example, when a control loop (or another control circuit) that takes effect (or plays a main role) in the voltage conversion circuit 101 or the inverter circuit 102 is a non-limiting power control loop, it may be determined that the voltage conversion circuit works in the maximum power state currently, and the voltage conversion circuit 101 may output a running status signal (for example, a low-level running status signal) indicating that the voltage conversion circuit is in the maximum power state. For another example, when a control loop (or another control circuit) that takes effect (or plays a main role) in the voltage conversion circuit 101 or the inverter circuit 102 is not a non-limiting power control loop (for example, a current or voltage control loop), it may be determined that the voltage conversion circuit 101 does not work in the maximum power state currently, and the voltage conversion circuit 101 (or another signal generation circuit in the photovoltaic inverter) may output a running status signal (for example, a high-level running status signal) indicating that the voltage conversion circuit is not in the maximum power state.

It may be understood that, when the voltage conversion circuit 101 does not work in the maximum power state, the power grid side (or an alternating current end of the photovoltaic inverter) may require the photovoltaic inverter to increase an output power (for example, an equivalent load on the power grid side is increased, or a grid-connected power corresponding to a grid-connected standard on the power grid side is increased, or an electric power consumption power of a local load is increased), to increase an input power of the inverter circuit. If the output power of the inverter circuit is adjusted based on an excessively large adjustment step, a system may discharge to the inverter circuit 102 by using the energy storage unit, to improve the output power of the inverter circuit, or a charge power of the energy storage unit may be decreased. In this way, when the photovoltaic inverter or another controller in the photovoltaic system detects that the energy storage unit discharges to the inverter circuit 102 by using the inverter circuit, or detects that the charge power of the energy storage unit is decreased, the photovoltaic inverter or another controller in the photovoltaic system may further adjust the inverter circuit to decrease the output power. This may cause the energy storage unit to repeatedly switch between a charge state and a discharge state, or cause a system grid-connected power to repeatedly fluctuate, or cause the voltage conversion circuit to fail to stably work in the maximum power state. If the output power of the inverter circuit is adjusted based on an excessively small adjustment step, the system may track a maximum power point too slowly. In this case, power supply efficiency of the photovoltaic system is reduced.

According to the embodiments, the controller 103 may obtain an estimated power increment value of an appropriate magnitude based on an output power of the inverter circuit between the current time period and the first time period, and adjust the output power of the inverter based on the estimated power increment value. This can avoid sacrificing energy storage efficiency of the energy storage unit in a process of increasing the output power of the inverter circuit by the photovoltaic system, and can also improve a speed of tracking the maximum power point by the voltage conversion circuit, improve stability of the voltage conversion circuit in a case in which the voltage conversion circuit works in the maximum power state, and improve power supply efficiency of the photovoltaic system. A structure is simple, a method is simple, and applicability is high.

In some implementations, the controller 103 may be configured to: when the voltage conversion circuit does not work in the maximum power state, obtain the output power of the inverter circuit in the current time period (for example, a moment T1) and the output power of the inverter circuit in the first time period (for example, a moment T0). Herein, the current time period may be a time period (or a moment) in which the controller 103 performs adjustment (or detection, control, or the like) on the output power of the inverter circuit this time, and the first time period may be a time period (or a moment) in which the controller 103 performs adjustment (or detection, control, or the like) on the output power of the inverter circuit last time (or previous time) or several times before (or several previous times). It may be understood that the first time period herein may be set to any time period (or moment) before the current time period based on an application scenario, and does not necessarily need to be adjacent to the current time period. Herein, the output power of the inverter circuit in a time period (for example, the current time period or the first time period) may be an average output power (or a power value that can indicate a capability of outputting electric energy by the voltage conversion circuit, for example, a maximum/ minimum output power or a weighted output power) in the time period, or may be an instantaneous output power at a specific moment (for example, a start moment, an end moment, or a sampling moment) in the time period, or may be an average output power (or a power value that can indicate a capability of outputting electric energy by the voltage conversion circuit, for example, a maximum/minimum output power or a weighted output power) at several moments (for example, a plurality of sampling moments) in the time period.

The controller 103 herein may be further configured to: when the voltage conversion circuit does not work in the maximum power state, if the difference between the output power of the inverter circuit in the current time period and the output power of the inverter circuit in the first time period is less than a first threshold, set the estimated power increment value of the inverter circuit to a first power increment value $\Delta P1$. For example, if the difference between the output power of the inverter circuit in the current time period and the output power of the inverter circuit in the first time period is x1, the estimated power increment value $\Delta P1$ of the inverter circuit may be calculated according to a formula $\Delta P1 = k \times x1 + A$, where k and A are coefficients or parameters designed based on a specific application scenario. Herein, the first threshold may be preset based on a power supply parameter of the inverter, an energy storage parameter of the energy storage unit, and/or a grid-connected parameter of the power grid in the application scenario, or may be calculated in real time based on an estimated power increment value of the inverter circuit in the first time period (or based on another parameter that can indicate the capability of outputting electric energy by the voltage conversion circuit) (for example, the first threshold may be obtained by multiplying the estimated power increment value in the first time period by a coefficient greater than 0.5 and less than 1), or may be calculated in real time based on a current environment (for example, a parameter like light intensity or a temperature). The first threshold herein may be a power value, may be a plurality of discrete power values, or may be a power interval including a plurality of discrete power values or continuous power values.

In the embodiments, the controller 103 may evaluate a capability of outputting electric energy by the voltage conversion circuit in the current time period based on a magnitude relationship between the first threshold and the difference between the output power of the inverter circuit in the current time period and the output power of the inverter circuit in the first time period, to obtain an estimated power increment value of an appropriate magnitude, and adjust the output power of the inverter based on the estimated power increment value. For example, when the difference between the output power in the current time period and the output power in the first time period is less than the first threshold, it is estimated that the capability of outputting electric energy by the voltage conversion circuit in the current time period is weak, so that a small estimated power increment value (for example, the first power increment value $\Delta P1$) is obtained, and the output power of the inverter is adjusted based on the estimated power increment value. That is, in the current time period, if the output power of the inverter is adjusted based on an estimated power increment value greater than the first power increment value, the charge power of the energy storage unit needs to be decreased or the energy storage unit needs to discharge for compensation. In other words, in the current time period, if the output power of the inverter is adjusted based on the first power increment value, the inverter may convert a part of direct current electric energy generated by a power supply (for example, a photovoltaic module) into alternating current electric energy, and provide the alternating current electric energy for the power grid, and there is no need to decrease the charge power of the energy storage unit or discharge the energy storage unit for compensation. Herein, the first power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period), or may be calculated in real time based on the current environment (for example, the parameter like the light intensity or the temperature). The first power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in a process of increasing the output power of the inverter circuit by the photovoltaic system, stability of the voltage conversion circuit working in the maximum power state can be improved, and power supply efficiency of the photovoltaic system can be improved. A structure is simple, a method is simple, and applicability is high.

In some implementations, the controller 103 may be further configured to: when the voltage conversion circuit does not work in the maximum power state, if the difference between the output power of the inverter circuit in the current time period (for example, a moment T2) and the output power of the inverter circuit in the first time period (for example, the moment T1) is greater than or equal to the first threshold, further increase the output power of the inverter circuit based on the output power of the inverter circuit in the current time period (for example, the moment T2) and an output power of the inverter circuit in a second time period (for example, the moment T1 or T0). The second time period is before the first time period. Herein, the current time period may be a time period (or a moment) in which the controller 103 performs adjustment (or detection, control, or the like) on the output power of the inverter circuit this time, and the second time period may be a time period (or a moment) in which the controller 103 performs adjustment (or detection, control, or the like) on the output power of the inverter circuit last time (or previous time) or several times before (or several previous times). It may be understood that the second time period herein may be set to any time period (or moment) before the current time period based on an application scenario, and does not necessarily need to be adjacent to the current time period. The time period (or the moment) indicated by the second time period may be the same as or different from the first time period. Herein, the output power of the inverter circuit in a time period (for example, the current time period or the second time period) may be an average output power (or a power value that can indicate a capability of receiving electric energy by the voltage conversion circuit (or outputting electric energy by the photovoltaic module), for example, a maximum/minimum output power or a weighted output power) in the time period, or may be an instantaneous output power at a specific moment (for example, a start moment, an end moment, or a sampling moment) in the time period, or may be an average output power (or a power value that can indicate a capability of receiving electric energy by the voltage conversion circuit (or outputting electric energy by the photovoltaic module), for example, a maximum/minimum output power or a weighted output power) at several moments (for example, a plurality of sampling moments) in the time period.

The controller 103 herein may be further configured to: when the difference between the output power of the inverter circuit in the current time period (for example, the moment T2) and the output power of the inverter circuit in the first time period (for example, the moment T1) is greater than or equal to the first threshold, and a difference between the output power of the inverter circuit in the current time period (for example, the moment T2) and the output power of the inverter circuit in the second time period (for example, the moment T1 or the moment TO) is less than a second threshold, set the estimated power increment value of the inverter circuit to a second estimated power increment value $\Delta P2$. For example, if the difference between the output power of the inverter circuit in the current time period and the output power of the inverter circuit in the first time period is x2, the estimated power increment value $\Delta P2$ of the inverter circuit may be calculated according to a formula $\Delta P2=k \times x2+A$. The second power increment value $\Delta P2$ is greater than the first power increment value $\Delta P1$. Herein, the second threshold may be preset based on the power supply parameter of the inverter, the energy storage parameter of the energy storage unit, and/or the grid-connected parameter of the power grid in the application scenario, or may be calculated in real time based on an estimated power increment value of the inverter circuit in the second time period (or based on another parameter that can indicate the capability of receiving electric energy by the voltage conversion circuit (or outputting electric energy by the photovoltaic module)) (for example, the second threshold may be obtained by multiplying the estimated power increment in the second time period by a coefficient, or the second threshold may be obtained by multiplying an estimated power increment in a previous time period of the second time period by a coefficient), or may be calculated in real time based on the current environment (for example, the parameter like the light intensity or the temperature). The second threshold herein may be a power value, may be a plurality of discrete power values, or may be a power interval including a plurality of discrete power values or continuous power values.

In the embodiments, the controller 103 may preliminarily evaluate a capability of receiving electric energy by the voltage conversion circuit in the current time period based on a magnitude relationship between the first threshold and the difference between the output power of the inverter circuit in the current time period and the output power of the inverter circuit in the first time period. When the difference between the output power in the current time period and the output power in the first time period is greater than or equal to the first threshold, the capability of receiving electric energy by the voltage conversion circuit (or outputting electric energy by the photovoltaic module) in the current time period is further evaluated based on a magnitude relationship between the difference between the output power of the inverter circuit in the current time period and the output power of the inverter circuit in the second time period and the second threshold, to obtain an estimated power increment value of an appropriate size, and adjust the output power of the inverter based on the estimated power increment value. For example, when the difference between the output power in the current time period and the output power in the first time period is greater than or equal to the first threshold, it is preliminarily estimated that the capability of outputting electric energy by the voltage conversion circuit in the current time period is strong, and the capability of receiving electric energy by the voltage conversion circuit (or outputting electric energy by the photovoltaic module) in the current time period may be further evaluated. When the difference between the output power of the inverter circuit in the current time period and the output power of the inverter circuit in the second time period is less than the second threshold, it is further evaluated that the capability of receiving electric energy by the voltage conversion circuit (or outputting electric energy by the photovoltaic module) in the current time period is strong, to obtain an estimated power increment value (for example, the second power increment value $\Delta P2$) greater than the first power increment value, and adjust the output power of the inverter based on the estimated power increment value.

That is, in the current time period, if the output power of the inverter is adjusted based on an estimated power increment value less than the second power increment value, the capability of receiving electric energy by the voltage conversion circuit in the current time period is not fully used, and more time needs to be spent to enable the inverter to work in the maximum power state. In other words, in the current time period, if the output power of the inverter is adjusted based on the second power increment value, the inverter can quickly work in the maximum power state while ensuring the charge power of the energy storage unit (or ensuring that the energy storage unit does not discharge), and more efficiently convert a part of the direct current electric energy generated by the power supply (for example, the photovoltaic module) into alternating current electric energy and provide the alternating current electric energy for the power grid. Herein, the second power increment value is greater than the first power increment value. The second power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period and the second time period), or may be calculated in real time based on the current environment (for example, the parameter like the light intensity or the temperature). The second power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in the process of increasing the output power of the inverter circuit by the photovoltaic system, a speed of tracking the maximum power point by the voltage conversion circuit can be improved, stability of the voltage conversion circuit working in the maximum power state can be improved, and power supply efficiency of the photovoltaic system can be improved. A structure is simple, a method is simple, and applicability is high.

In some implementations, the controller 103 may be further configured to: when the voltage conversion circuit does not work in the maximum power state, if the difference between the output power of the inverter circuit in the current time period (for example, a moment T3) and the output power of the inverter circuit in the first time period (for example, the moment T2) is greater than or equal to the first threshold, and the difference between the output power of the inverter circuit in the current time period (for example, the moment T3) and the output power of the inverter circuit in the second time period (for example, the moment T2) is greater than or equal to the second threshold, set the estimated power increment value of the inverter circuit to a third power increment value $\Delta P3$. For example, if the difference between the output power of the inverter circuit in the current time period and the output power of the inverter circuit in the first time period is x3, the estimated power increment value $\Delta P3$ of the inverter circuit may be calculated according to a formula $\Delta P3=k \times x3+A$. The third power increment value $\Delta P3$ is greater than the second power increment value $\Delta P2$.

With reference to FIG. 4 again, it can be seen that the magnitude of the estimated power increment value (for example, $\Delta P1$, $\Delta P2$, and $\Delta P3$) of the inverter circuit is in direct proportion to the difference (for example, x1, x2, and x3) between the output power in the current time period and the output power in the first time period. Herein, being in direct proportion may be a linear function relationship of $\Delta P=k \times x+A$, or further, may be a preset value of a positive correlation relationship of a non-linear function that is preset in advance based on an experiment test in a specific scenario.

In the embodiments, the controller 103 may preliminarily evaluate the capability of receiving electric energy by the voltage conversion circuit in the current time period based on the magnitude relationship between the first threshold and the difference between the output power of the inverter circuit in the current time period and the output power of the inverter circuit in the first time period. When the difference between the output power in the current time period and the output power in the first time period is greater than or equal to the first threshold, the capability of receiving electric energy by the voltage conversion circuit (or outputting electric energy by the photovoltaic module) in the current time period is further evaluated based on a magnitude relationship between the difference between the output power of the inverter circuit in the current time period and the output power of the inverter circuit in the second time period and the second threshold, to obtain an estimated power increment value of an appropriate size, and adjust the output power of the inverter based on the estimated power increment value. For example, when the difference between the output power in the current time period and the output power in the first time period is greater than or equal to the first threshold, it is preliminarily estimated that the capability of outputting electric energy by the voltage conversion circuit in the current time period is strong, and the capability of receiving electric energy by the voltage conversion circuit (or outputting electric energy by the photovoltaic module) in the current time period may be further evaluated. When the difference between the output power of the inverter circuit in the current time period and the output power of the inverter circuit in the second time period is greater than or equal to the second threshold, it is further evaluated that the capability of receiving electric energy by the voltage conversion circuit (or outputting electric energy by the photovoltaic module) in the current time period is stronger, to obtain an estimated power increment value (for example, the third power increment value $\Delta P3$) greater than the second power increment value, and adjust the output power of the inverter based on the estimated power increment value.

That is, in the current time period, if the output power of the inverter is adjusted based on an estimated power increment value less than the third power increment value, the capability of receiving electric energy by the voltage conversion circuit in the current time period is not fully used, and more time needs to be spent to enable the inverter to work in the maximum power state. In other words, in the current time period, if the output power of the inverter is adjusted based on the third power increment value, the inverter can quickly work in the maximum power state while ensuring the charge power of the energy storage unit (or ensuring that the energy storage unit does not discharge), and more efficiently convert a part of the direct current electric energy generated by the power supply (for example, the photovoltaic module) into alternating current electric energy and provide the alternating current electric energy for the power grid. Herein, the third power increment value $\Delta P3$ is greater than the second power increment value $\Delta P2$. The third power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period and the second time period), or may be calculated in real time based on the current environment (for example, the parameter like the light intensity or the temperature). The third power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in the process of increasing the output power of the inverter circuit by the photovoltaic system, a speed of tracking the maximum power point by the voltage conversion circuit can be further improved, stability of the voltage conversion circuit working in the maximum power state can be improved, and power supply efficiency of the photovoltaic system can be improved. A structure is simple, a method is simple, and applicability is high.

In some implementations, the controller 103 may be configured to set the estimated power increment value of the inverter circuit to a fourth power increment value $\Delta P4$ when the voltage conversion circuit switches from the maximum power state to a non-maximum power state (for example, at the moment TO). The fourth power increment value is less than the second power increment value. Herein, when the voltage conversion circuit switches from the maximum power state to the non-maximum power state, the controller 103 is at a state switching moment (or time point), and the controller 103 may first adjust the output power of the inverter based on a small estimated power increment value (for example, the fourth power increment value $\Delta P4$). That is, when the voltage conversion circuit switches from the maximum power state to the non-maximum power state, if the output power of the inverter is adjusted based on an estimated power increment value greater than the fourth power increment value, the charge power of the energy storage unit may need to be decreased or the energy storage unit may discharge for compensation. In other words, when the voltage conversion circuit switches from the maximum power state to the non-maximum power state, if the output power of the inverter is adjusted based on an estimated small power increment value (for example, the fourth power increment value $\Delta P4$), it can be ensured that the inverter converts a part of the direct current electric energy generated by the power supply (for example, the photovoltaic module) into alternating current electric energy and provides the alternating current electric energy for the power grid, and there is no need to decrease the charge power of the energy storage unit or discharge the energy storage unit for compensation. Herein, the fourth power increment value is less than the second power increment value, and may be equal to the first power increment value in some scenarios. The fourth power increment value may be preset based on the power supply parameter of the inverter, the energy storage parameter of the energy storage unit, and/or the grid-connected parameter of the power grid in the application scenario, or may be calculated based on the estimated power increment value of the inverter circuit (or may be calculated based on another parameter that can indicate the capability of outputting electric energy by the voltage conversion circuit) in a previous (for example, when the voltage conversion circuit is in the non-maximum power state last time) time period or several previous time periods (for example, the first time period and the second time period corresponding to a case in which the voltage conversion circuit is in the non-maximum power state last time), or may be calculated in real time based on the current environment (for example, the parameter like the light intensity or the temperature). The fourth power increment value herein may be a power increment value, may be a plurality of discrete power increment values, or may be a power increment interval formed including a plurality of discrete power increment values or continuous power increment values. According to the embodiments, a case in which the photovoltaic system sacrifices energy storage efficiency of the energy storage unit when the voltage conversion circuit switches from the maximum power state to the non-maximum power state can be avoided, stability of the voltage conversion circuit working in the maximum power state can be improved, and power supply efficiency of the photovoltaic system can be improved. A structure is simple, a method is simple, and applicability is high.

In some implementations, the controller 103 may be configured to set the estimated power increment value of the inverter circuit to zero when the voltage conversion circuit works in the maximum power state. According to the embodiments, stability of the voltage conversion circuit working in the maximum power state can be improved, and power supply efficiency of the photovoltaic system can be improved. A structure is simple, a method is simple, and applicability is high.

In some implementations, the controller 103 may further output a power adjustment signal to the inverter circuit 102 and/or the voltage conversion circuit 101 based on the estimated power increment value, and control the output power of the inverter circuit by using the power adjustment signal. Herein, the controller 103 may further generate the power adjustment signal based on the estimated power increment value (for example, generate a modulation signal based on the estimated power increment value as the power adjustment signal), and control the inverter circuit 102 and/or the voltage conversion circuit 101 (for example, control the inverter circuit 102 and/or a switching transistor in the voltage conversion circuit 101) by using the power adjustment signal, to adjust the output power of the inverter circuit, so as to correspondingly adjust the input power of the inverter circuit. A structure is simple, and a control method is simple.

In the embodiments, functional modules in the photovoltaic inverter have various and flexible composition manners, and can adapt to different application scenarios, to improve diversity of application scenarios of the photovoltaic inverter, and enhance adaptability of the photovoltaic inverter. In addition, any photovoltaic inverter shown in FIG. 1 to FIG. 4 may determine a different estimated power increment value based on a power supply capability of the photovoltaic system, and adjust the output power of the inverter based on the estimated power increment value, to improve a speed of tracking the maximum power point by the voltage conversion circuit, improve stability of the voltage conversion circuit in a case in which the voltage conversion circuit works in the maximum power state, and improve power supply efficiency of the photovoltaic system. A structure is simple, a method is simple, and applicability is strong.

Figure 5:
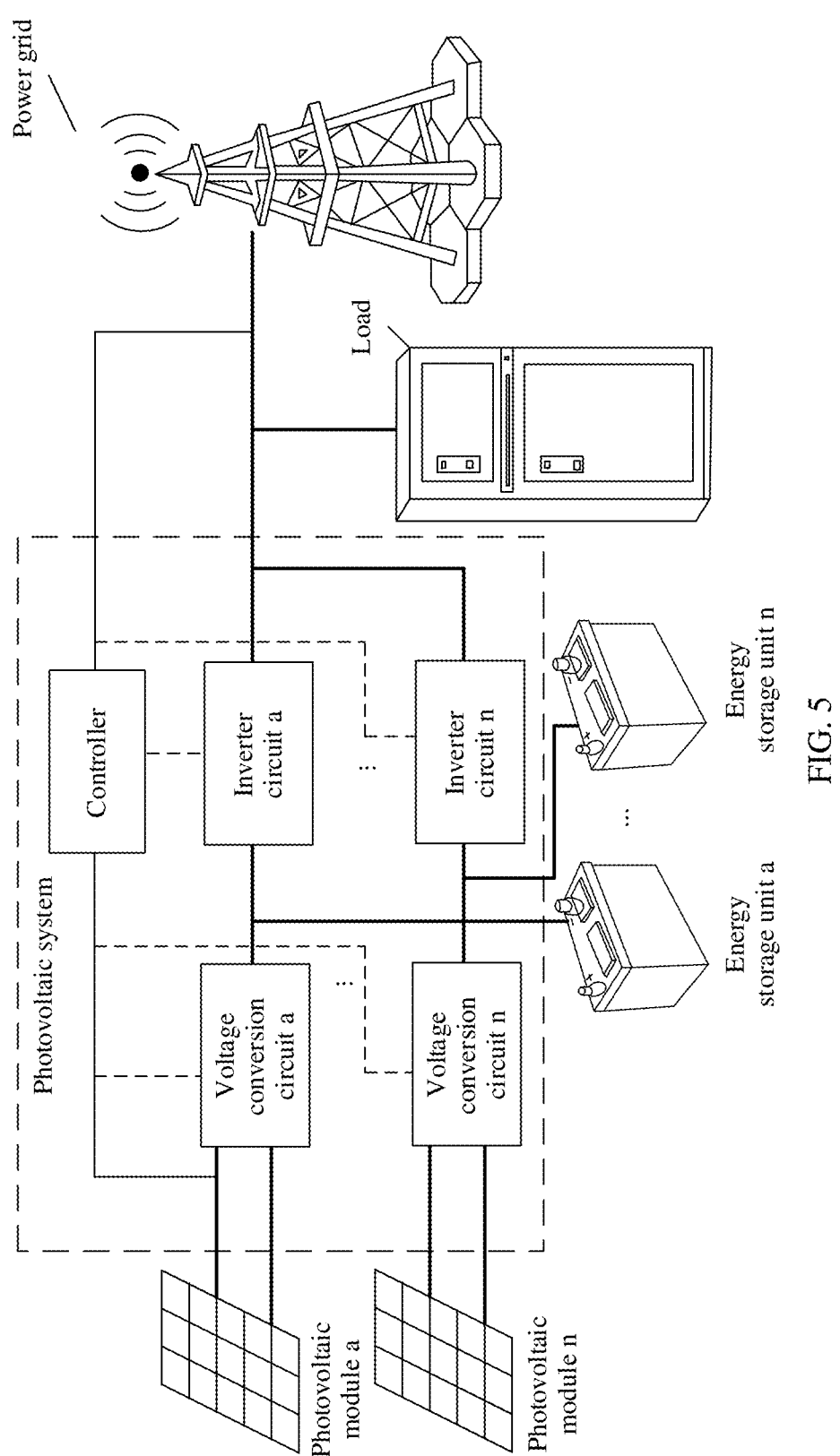
FIG. 5 is a schematic diagram of a structure of a photovoltaic system according to an embodiment.

The embodiments further provide a photovoltaic system. The photovoltaic system may include a plurality of photovoltaic inverters, where the photovoltaic inverter is any photovoltaic inverter shown in FIG. 1 to FIG. 4. FIG. 5 is a schematic diagram of a structure of the photovoltaic system according to an embodiment. As shown in FIG. 5, one end of each of the plurality of photovoltaic inverters (for example, an input end of each of a voltage conversion circuit a to a voltage conversion circuit n) herein may be connected to a photovoltaic module (for example, each of a photovoltaic module a to a photovoltaic module n) in a one-to-one correspondence. The other ends (for example, output ends of an inverter circuit a to an inverter circuit n) of the plurality of photovoltaic inverters may be configured to connect to a power grid after being connected in parallel (or may be connected, by using a load, to a power grid after being connected in parallel). The output ends of the voltage conversion circuit a to the voltage conversion circuit n may be respectively connected to the input ends of the inverter circuit a to the inverter circuit n in a one-to-one correspondence. An energy storage unit a to an energy storage unit n may be respectively connected between the voltage conversion circuit a to the voltage conversion circuit n and the inverter circuit a to the inverter circuit n in a one-to-one correspondence, for example, the energy storage unit a is connected between the voltage conversion circuit a and the inverter circuit a, and the energy storage unit n is connected between the voltage conversion circuit n and the inverter circuit n. The plurality of photovoltaic inverters may reuse one controller (or several controllers), or controllers in the plurality of photovoltaic inverters are integrated into one control module (not shown in the figure). According to the embodiments, each of the controllers (or the control module) in the plurality of photovoltaic inverters may correspondingly obtain at least one appropriate estimated power increment value based on an output power of at least one inverter circuit between a current time period and a first time period, and adjust the output power of the at least one inverter circuit based on the corresponding estimated power increment value. In this way, energy storage efficiency of the energy storage unit can be avoided from being sacrificed in a process of increasing the output power of the inverter circuit by the photovoltaic system, a speed of tracking a maximum power point by the voltage conversion circuit can be improved, stability of the voltage conversion circuit working in a maximum power state can be improved, and power supply efficiency of the photovoltaic system can be improved. A structure is simple, a method is simple, and applicability is high.

Figure 6:
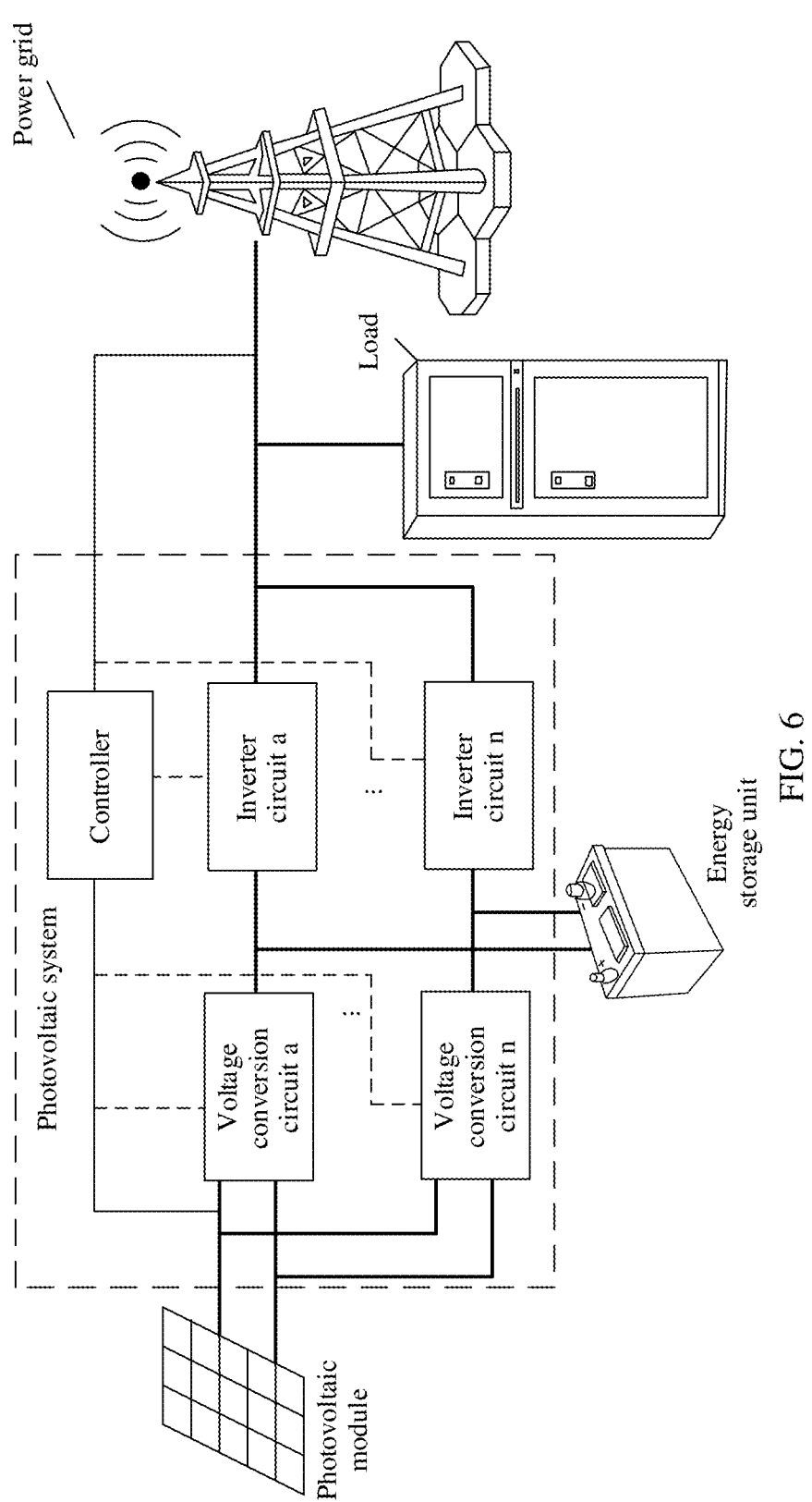
FIG. 6 is a schematic diagram of another structure of a photovoltaic system according to an embodiment.

In some implementations, FIG. 6 is a schematic diagram of another structure of the photovoltaic system according to an embodiment. As shown in FIG. 6, one end of each of the plurality of photovoltaic inverters (for example, an input end of each of a voltage conversion circuit a to a voltage conversion circuit n) herein may be connected to a photovoltaic module. The other ends (for example, output ends of an inverter circuit a to an inverter circuit n) of the plurality of photovoltaic inverters may be configured to connect to a power grid after being connected in parallel (or may be connected, by using a load, to a power grid after being connected in parallel). The output ends of the voltage conversion circuit a to the voltage conversion circuit n may be respectively connected to the input ends of the inverter circuit a to the inverter circuit n in a one-to-one correspondence. An energy storage unit may be connected between the voltage conversion circuit a and the inverter circuit a and between the voltage conversion circuit n and the inverter circuit n. The plurality of photovoltaic inverters may reuse one controller (or several controllers), or controllers in the plurality of photovoltaic inverters are integrated into one control module (not shown in the figure). According to the embodiments, each of the controllers (or the control module) in the plurality of photovoltaic inverters may correspondingly obtain at least one appropriate estimated power increment value based on an output power of at least one inverter circuit between a current time period and a first time period, and adjust the output power of the at least one inverter circuit based on the corresponding estimated power increment value. In this way, energy storage efficiency of the energy storage unit can be avoided from being sacrificed in a process of increasing the output power of the inverter circuit by the photovoltaic system, a speed of tracking a maximum power point by the voltage conversion circuit can be improved, stability of the voltage conversion circuit working in a maximum power state can be improved, and power supply efficiency of the photovoltaic system can be improved. A structure is simple, a method is simple, and applicability is high.

In the embodiments, the photovoltaic system and functional modules in the photovoltaic inverter have various and flexible composition manners, and can adapt to different application scenarios, to improve diversity of application scenarios of the photovoltaic inverter, and enhance adaptability of the photovoltaic inverter. In addition, any photovoltaic inverter shown in FIG. 1 to FIG. 6 may determine a different estimated power increment value based on a power supply capability of the photovoltaic system, and adjust the output power of the inverter based on the estimated power increment value, to improve a speed of tracking the maximum power point by the voltage conversion circuit, improve stability of the voltage conversion circuit in a case in which the voltage conversion circuit works in the maximum power state, and improve power supply efficiency of the photovoltaic system. A structure is simple, a method is simple, and applicability is strong. For case of description, the following uses the structure of the photovoltaic inverter shown in FIG. 1 as an example to describe a control method provided in embodiments.

FIG. 7 is a schematic flowchart of a control method according to the embodiments. The control method provided in the embodiments is applicable to a photovoltaic inverter, and the photovoltaic inverter includes a voltage conversion circuit, an inverter circuit, and a controller. Herein, one end of the voltage conversion circuit may be configured to connect to a photovoltaic module, the other end of the voltage conversion circuit may be configured to connect to one end of the inverter circuit, the other end of the inverter circuit may be configured to connect to a load and a power grid, and the inverter circuit and the power grid are connected to a grid-connected point. The voltage conversion circuit herein may be configured to output, to the inverter circuit, a direct current input by the photovoltaic module. The inverter circuit herein is configured to: receive the direct current output by the voltage conversion circuit, convert the received direct current output by the voltage conversion circuit into an alternating current, and output the alternating current to the power grid. As shown in FIG. 7, the control method provided in the embodiments includes the following steps:

S801: Increase, based on an output power of the inverter circuit in a current time period and an output power of the inverter circuit in a first time period, an output power of the inverter circuit when the voltage conversion circuit does not work in a maximum power state.

When the voltage conversion circuit does not work in the maximum power state, the output power of the inverter circuit is increased based on the output power of the inverter circuit in the current time period and the output power of the inverter circuit in the first time period. Herein, an increase of the output power of the inverter circuit may be represented as an estimated power increment value of the inverter circuit, and the estimated power increment value of the inverter circuit is in direct proportion to a difference between the output power in the current time period and the output power in the first time period. Herein, being in direct proportion may be a linear function relationship, or may be a positive correlation relationship of a non-linear function. For example, if the difference between the output power of the inverter circuit in the current time period and the output power of the inverter circuit in the first time period is x, the estimated power increment value $\Delta P$ of the inverter circuit may be calculated according to a formula $\Delta P = k \times x + A$, where k and A are coefficients or parameters designed based on a specific application scenario.

Herein, the first time period is before the current time period, the current time period may be a time period (or a moment) in which the controller performs adjustment (or detection, control, or the like) on the output power of the inverter circuit this time, and the first time period may be a time period (or a moment) in which the controller performs adjustment (or detection, control, or the like) on the output power of the inverter circuit last time (or previous time) or several times before (or several previous times). It may be understood that the first time period herein may be set to any time period (or moment) before the current time period based on an application scenario, and does not necessarily need to be adjacent to the current time period. Herein, an output power of the inverter circuit in a time period (for example, the current time period or the first time period) may be an average output power (or a power value that can indicate a capability of outputting electric energy by the voltage conversion circuit, for example, a maximum/minimum output power or a weighted output power) in the time period, or may be an instantaneous output power at a specific moment (for example, a start moment, an end moment, or a sampling moment) in the time period, or may be an average output power (or a power value that can indicate a capability of outputting electric energy by the voltage conversion circuit, for example, a maximum/minimum output power or a weighted output power) at several moments (for example, a plurality of sampling moments) in the time period.

In the embodiments, the photovoltaic module (or a photovoltaic string including a plurality of photovoltaic modules) may be used as a power supply to connect to the power grid by using the photovoltaic inverter, and the photovoltaic inverter may convert direct current electric energy provided by the photovoltaic module into alternating current electric energy, and provide the alternating current electric energy for the power grid. Herein, the photovoltaic inverter may include the voltage conversion circuit and the inverter circuit. The voltage conversion circuit may convert an output voltage of the photovoltaic module into a direct current voltage that matches the inverter circuit, and transmit the direct current voltage to the inverter circuit. The inverter circuit may convert direct current electric energy into alternating current electric energy, so that electric energy output by the inverter circuit can adapt to an alternating current power grid. In a photovoltaic power supply scenario, to maximize use of electric energy generated by the photovoltaic module, the photovoltaic inverter may supply power by using an MPPT technology, that is, control an output power of the inverter, to enable the photovoltaic module to work at a maximum power point, so that the inverter can output electric energy to the power grid at a maximum output power. However, in some cases, for example, if an output power required by the power grid (including the load) is low, the output power of the inverter also needs to be controlled to be in a non-MPPT state, that is, the inverter does not work in a maximum power state. In the non-MPPT state, the output power of the inverter may need to be increased according to a scheduling instruction. However, the maximum output power of the inverter is unknown when the inverter is in the non-MPPT state. In this case, the output power of the inverter is increased too much. As a result, the output power of the inverter exceeds a power output capability of the inverter. This may cause system breakdown.

In the embodiments, a concept of the estimated power increment value is introduced. The controller may adjust the output power of the inverter based on the estimated power increment value. It should be understood that the output power of the inverter is determined by the output power of the inverter circuit in the inverter, and the output power of the inverter circuit is limited by an output power of the previous-stage voltage conversion circuit. In other words, a power output capability of the previous-stage voltage conversion circuit needs to be considered for the increase of the output power of the inverter, and the estimated power increment value herein may be obtained based on the output power of the inverter circuit in the current time period and the output power of the inverter circuit in the first time period. It may be understood that the controller may evaluate a capability of outputting electric energy by the voltage conversion circuit in the current time period based on the output power of the inverter circuit in the current time period and the output power of the inverter circuit in the first time period, to obtain an estimated power increment value of an appropriate magnitude, and adjust the output power of the inverter based on the estimated power increment value. In other words, the controller may obtain an estimated power increment value of an appropriate magnitude based on an output power of the inverter circuit between the current time period and the first time period, and adjust the output power of the inverter based on the estimated power increment value. This can avoid a decrease of a bus voltage that is caused in a process of increasing the output power of the inverter circuit by the photovoltaic system based on an excessively large step, improve stability of the bus voltage, stably increase the output power of the inverter while ensuring stable operation of the inverter and safe use of a power component, and improve power supply efficiency of the photovoltaic system.

In some implementations, the other end of the voltage conversion circuit may be configured to connect to the energy storage unit, and is configured to output, to the energy storage unit, a direct current input by the photovoltaic module. The inverter circuit herein may be configured to: receive the direct current output by the energy storage unit, convert the received direct current output by the energy storage unit into an alternating current, and output the alternating current to the power grid.

Herein, the photovoltaic inverter may further be connected to the energy storage unit (for example, connected to the energy storage unit by using the voltage conversion circuit), to store, in the energy storage unit, a part of direct current electric energy output by the photovoltaic module, convert the other part of the direct current electric energy output by the photovoltaic module into alternating current electric energy, and transmit the alternating current electric energy to the power grid. In some application scenarios, the photovoltaic inverter (for example, the inverter circuit in the photovoltaic inverter) may further be connected to the power grid at the grid-connected point after being connected to a local load.

It may be understood that, when the voltage conversion circuit does not work in the maximum power state, the power grid side (or an alternating current end of the photovoltaic inverter) may require the inverter circuit to increase an output power (for example, an equivalent load on the power grid side is increased, or a grid-connected power corresponding to a grid-connected standard on the power grid side is increased, or an electric power consumption power of the local load is increased), to increase an input power of the inverter circuit. If the output power of the inverter circuit is adjusted based on an excessively large adjustment step, the bus voltage may be decreased. As a result, the system discharges to the inverter circuit by using the energy storage unit, to increase the output power of the inverter circuit, or a charge power of the energy storage unit is decreased, or it is detected that the bus voltage is decreased. In this way, when the photovoltaic inverter or another controller in the photovoltaic system detects that the energy storage unit discharges to the inverter circuit by using the inverter circuit, or detects that the charge power of the energy storage unit is decreased, the photovoltaic inverter or another controller in the photovoltaic system may further adjust the inverter circuit to decrease the output power. This may cause the energy storage unit to repeatedly switch between a charge state and a discharge state, or cause a system grid-connected power to repeatedly fluctuate, or cause the bus voltage to repeatedly fluctuate, or cause the voltage conversion circuit to fail to stably work in the maximum power state. If the output power of the inverter circuit is adjusted based on an excessively small adjustment step, the system may track the maximum power point too slowly. In this case, power supply efficiency of the photovoltaic system is reduced.

In the embodiments, the controller may evaluate the capability of outputting electric energy by the voltage conversion circuit in the current time period based on the output power of the inverter circuit in the current time period and the output power of the inverter circuit in the first time period, to obtain an estimated power increment value of an appropriate magnitude, and adjust the output power of the inverter based on the estimated power increment value. In other words, the controller may obtain an estimated power increment value of an appropriate magnitude based on the output power of the inverter circuit between the current time period and the first time period, and adjust the output power of the inverter based on the estimated power increment value. This can avoid sacrificing energy storage efficiency of the energy storage unit in the process of increasing the output power of the inverter circuit by the photovoltaic system, and can also improve a speed of tracking the maximum power point by the voltage conversion circuit, improve stability of the voltage conversion circuit in a case in which the voltage conversion circuit works in the maximum power state, improve stability of the bus voltage, improve the output power of the inverter while ensuring stable running of the inverter and safe use of the power component, and improve power supply efficiency of the photovoltaic system.

In some implementations, FIG. 8 is another schematic flowchart of the control method according to the embodiments. As shown in FIG. 8, the increasing, based on an output power of the inverter circuit in a current time period and an output power of the inverter circuit in a first time period, an output power of the inverter circuit when the voltage conversion circuit does not work in a maximum power state may further include the following steps.

S901: When the voltage conversion circuit does not work in the maximum power state, determine whether a difference between the output power of the inverter circuit in the current time period and the output power of the inverter circuit in the first time period is greater than or equal to a first threshold. If a determining result is no, step S902 is performed. If a determining result is yes, step S903 is performed.

S902: Set the estimated power increment value of the inverter circuit to a first power increment value.

Herein, the current time period may be a time period (or a moment) in which the controller performs adjustment (or detection, control, or the like) on the output power of the inverter circuit this time, and the first time period may be a time period (or a moment) in which the controller performs adjustment (or detection, control, or the like) on the output power of the inverter circuit last time (or previous time) or several times before (or previous several times). It may be understood that the first time period herein may be set to any time period (or moment) before the current time period based on an application scenario, and does not necessarily need to be adjacent to the current time period. Herein, an output power of the inverter circuit in a time period (for example, the current time period or the first time period) may be an average output power (or a power value that can indicate a capability of outputting electric energy by the voltage conversion circuit, for example, a maximum/minimum output power or a weighted output power) in the time period, or may be an instantaneous output power at a specific moment (for example, a start moment, an end moment, or a sampling moment) in the time period, or may be an average output power (or a power value that can indicate a capability of outputting electric energy by the voltage conversion circuit, for example, a maximum/minimum output power or a weighted output power) at several moments (for example, a plurality of sampling moments) in the time period.

Herein, the first threshold may be preset based on a power supply parameter of the inverter, an energy storage parameter of the energy storage unit, and/or a grid-connected parameter of the power grid in the application scenario, or may be calculated in real time based on an estimated power increment value of the inverter circuit in the first time period (or based on another parameter that can indicate the capability of outputting electric energy by the voltage conversion circuit) (for example, the first threshold may be obtained by multiplying the estimated power increment value in the first time period by a coefficient greater than 0.5 and less than 1), or may be calculated in real time based on a current environment (for example, a parameter like light intensity or a temperature). The first threshold herein may be a power value, may be a plurality of discrete power values, or may be a power interval including a plurality of discrete power values or continuous power values.

In the embodiments, the controller may evaluate a capability of outputting electric energy by the voltage conversion circuit in the current time period based on a magnitude relationship between the first threshold and the difference between the output power of the inverter circuit in the current time period and the output power of the inverter circuit in the first time period, to obtain an estimated power increment value of an appropriate magnitude, and adjust the output power of the inverter based on the estimated power increment value. For example, when the difference between the output power in the current time period and the output power in the first time period is less than the first threshold, it is estimated that the capability of outputting electric energy by the voltage conversion circuit in the current time period is weak, so that a small estimated power increment value (for example, the first power increment value $\Delta P1$) is obtained, and the output power of the inverter is adjusted based on the estimated power increment value. That is, in the current time period, if the output power of the inverter is adjusted based on an estimated power increment value greater than the first power increment value, the charge power of the energy storage unit needs to be decreased or the energy storage unit needs to discharge for compensation. In other words, in the current time period, if the output power of the inverter is adjusted based on the first power increment value, the inverter may convert a part of direct current electric energy generated by a power supply (for example, a photovoltaic module) into alternating current electric energy, and provide the alternating current electric energy for the power grid, and there is no need to decrease the charge power of the energy storage unit or discharge the energy storage unit for compensation. Herein, the first power increment value may be preset based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period) (for example, the first power increment value may be obtained by multiplying an estimated power increment in a second time period by a coefficient, or the first power increment value may be obtained by multiplying an estimated power increment in a previous time period of a second time period by a coefficient), or may be calculated in real time based on the current environment (for example, the parameter like the light intensity or the temperature). The first power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in a process of increasing the output power of the inverter circuit by the photovoltaic system, stability of the voltage conversion circuit working in the maximum power state can be improved, and power supply efficiency of the photovoltaic system can be improved. A structure is simple, a method is simple, and applicability is high.

S903: Determine whether a difference between the output power of the inverter circuit in the current time period and an output power of the inverter circuit in the second time period is greater than or equal to a second threshold. If a determining result is no, step S904 is performed. If a determining result is yes, step S905 is performed.

S904: Set the estimated power increment value of the inverter circuit to a second power increment value.

Herein, the current time period may be a time period (or a moment) in which the controller performs adjustment (or detection, control, or the like) on the output power of the inverter circuit this time, and the second time period may be a time period (or a moment) in which the controller performs adjustment (or detection, control, or the like) on the output power of the inverter circuit last time (or previous time) or several times before (or previous several times). It may be understood that the second time period herein may be set to any time period (or moment) before the current time period based on an application scenario, and does not necessarily need to be adjacent to the current time period. The time period (or the moment) indicated by the second time period may be the same as or different from the first time period. Herein, the output power of the inverter circuit in a time period (for example, the current time period or the second time period) may be an average output power (or a power value that can indicate a capability of receiving electric energy by the voltage conversion circuit (or outputting electric energy by the photovoltaic module), for example, a maximum/minimum output power or a weighted output power) in the time period, or may be an instantaneous output power at a specific moment (for example, a start moment, an end moment, or a sampling moment) in the time period, or may be an average output power (or a power value that can indicate a capability of receiving electric energy by the voltage conversion circuit (or outputting electric energy by the photovoltaic module), for example, a maximum/minimum output power or a weighted output power) at several moments (for example, a plurality of sampling moments) in the time period. Herein, the second threshold may be preset based on the power supply parameter of the inverter, the energy storage parameter of the energy storage unit, and/or the grid-connected parameter of the power grid in the application scenario, or may be calculated in real time based on the estimated power increment value of the inverter circuit in the second time period (or based on another parameter that can indicate the capability of receiving electric energy by the voltage conversion circuit (or outputting electric energy by the photovoltaic module)), or may be calculated in real time based on the current environment (for example, the parameter like the light intensity or the temperature). The second threshold herein may be a power value, may be a plurality of discrete power values, or may be a power interval including a plurality of discrete power values or continuous power values.

In the embodiments, the controller may preliminarily evaluate the capability of receiving electric energy by the voltage conversion circuit in the current time period based on the magnitude relationship between the first threshold and the difference between the output power of the inverter circuit in the current time period and the output power of the inverter circuit in the first time period. When the difference between the output power in the current time period and the output power in the first time period is greater than or equal to the first threshold, the capability of receiving electric energy by the voltage conversion circuit (or outputting electric energy by the photovoltaic module) in the current time period is further evaluated based on a magnitude relationship between the difference between the output power of the inverter circuit in the current time period and the output power of the inverter circuit in the second time period and the second threshold, to obtain an estimated power increment value of an appropriate size, and adjust the output power of the inverter based on the estimated power increment value. For example, when the difference between the output power in the current time period and the output power in the first time period is greater than or equal to first threshold, it is preliminarily estimated that the capability of outputting electric energy by the voltage conversion circuit in the current time period is strong, and a capability of receiving electric energy by the voltage conversion circuit (or outputting electric energy by the photovoltaic module) in the current time period may be further evaluated. When the difference between the output power of the inverter circuit in the current time period and the output power of the inverter circuit in the second time period is less than the second threshold, it is further evaluated that the capability of receiving electric energy by the voltage conversion circuit (or outputting electric energy by the photovoltaic module) in the current time period is strong, to obtain an estimated power increment value (for example, the second power increment value ΔP2) greater than the first power increment value, and adjust the output power of the inverter based on the estimated power increment value.

That is, in the current time period, if the output power of the inverter is adjusted based on an estimated power increment value less than the second power increment value, the capability of receiving electric energy by the voltage conversion circuit in the current time period is not fully used, and more time needs to be spent to enable the inverter to work in the maximum power state. In other words, in the current time period, if the output power of the inverter is adjusted based on the second power increment value, the inverter can quickly work in the maximum power state while ensuring the charge power of the energy storage unit (or ensuring that the energy storage unit does not discharge), and more efficiently convert a part of the direct current electric energy generated by the power supply (for example, the photovoltaic module) into alternating current electric energy and provide the alternating current electric energy for the power grid. Herein, the second power increment value is greater than the first power increment value. The second power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period and the second time period), or may be calculated in real time based on the current environment (for example, the parameter like the light intensity or the temperature). The second power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in the process of increasing the output power of the inverter circuit by the photovoltaic system, a speed of tracking the maximum power point by the voltage conversion circuit can be improved, stability of the voltage conversion circuit working in the maximum power state can be improved, and power supply efficiency of the photovoltaic system can be improved. A structure is simple, a method is simple, and applicability is high.

S905: Set the estimated power increment value of the inverter circuit to a third power increment value.

In the embodiments, the controller may preliminarily evaluate the capability of receiving electric energy by the voltage conversion circuit in the current time period based on the magnitude relationship between the first threshold and the difference between the output power of the inverter circuit in the current time period and the output power of the inverter circuit in the first time period. When the difference between the output power in the current time period and the output power in the first time period is greater than or equal to the first threshold, the capability of receiving electric energy by the voltage conversion circuit (or outputting electric energy by the photovoltaic module) in the current time period is further evaluated based on a magnitude relationship between the difference between the output power of the inverter circuit in the current time period and the output power of the inverter circuit in the second time period and the second threshold, to obtain an estimated power increment value of an appropriate size, and adjust the output power of the inverter based on the estimated power increment value. For example, when the difference between the output power in the current time period and the output power in the first time period is greater than or equal to the first threshold, it is preliminarily estimated that the capability of outputting electric energy by the voltage conversion circuit in the current time period is strong, and a capability of receiving electric energy by the voltage conversion circuit (or outputting electric energy by the photovoltaic module) in the current time period may be further evaluated. When the difference between the output power of the inverter circuit in the current time period and the output power of the inverter circuit in the second time period is greater than or equal to the second threshold, it is further evaluated that the capability of receiving electric energy by the voltage conversion circuit (or outputting electric energy by the photovoltaic module) in the current time period is stronger, to obtain an estimated power increment value (for example, the third power increment value $\Delta P3$) greater than the second power increment value, and adjust the output power of the inverter based on the estimated power increment value.

That is, in the current time period, if the output power of the inverter is adjusted based on an estimated power increment value less than the third power increment value, the capability of receiving electric energy by the voltage conversion circuit in the current time period is not fully used, and more time needs to be spent to enable the inverter to work in the maximum power state. In other words, in the current time period, if the output power of the inverter is adjusted based on the third power increment value, the inverter can quickly work in the maximum power state while ensuring the charge power of the energy storage unit (or ensuring that the energy storage unit does not discharge), and more efficiently convert a part of the direct current electric energy generated by the power supply (for example, the photovoltaic module) into alternating current electric energy and provide the alternating current electric energy for the power grid. Herein, the third power increment value is greater than the second power increment value. The third power increment value may be calculated in real time based on the power supply parameter of the inverter, the energy storage parameter of the energy storage unit, and/or the grid-connected parameter of the power grid in the application scenario, or may be calculated in real time based on an estimated power increment value (or based on another parameter that can indicate the capability of outputting electric energy by the voltage conversion circuit) of the inverter circuit in a previous time period or several previous time periods (for example, the first time period and the second time period), or may be calculated in real time based on the current environment (for example, the parameter like the light intensity or the temperature). The third power increment value herein may be a power increment value, may be a plurality of discrete power increment values, or may be a power increment interval formed including a plurality of discrete power increment values or continuous power increment values. According to the embodiments, energy storage efficiency of the energy storage unit can be avoided from being sacrificed in the process of increasing the output power of the inverter circuit by the photovoltaic system, a speed of tracking the maximum power point by the voltage conversion circuit can be further improved, stability of the voltage conversion circuit working in the maximum power state can be improved, and power supply efficiency of the photovoltaic system can be improved. A structure is simple, a method is simple, and applicability is high.

In some implementations, the method further includes:

setting the estimated power increment value of the inverter circuit to a fourth power increment value when the voltage conversion circuit switches from the maximum power state to a non-maximum power state, where the fourth power increment value is less than the second power increment value.

Herein, when the voltage conversion circuit switches from the maximum power state to the non-maximum power state, the controller is at a state switching moment (or time point), and the controller may first adjust the output power of the inverter based on a small estimated power increment value (for example, the fourth power increment value ΔP4). That is, when the voltage conversion circuit switches from the maximum power state to the non-maximum power state, if the output power of the inverter is adjusted based on an estimated power increment value greater than the fourth power increment value, the charge power of the energy storage unit may need to be decreased or the energy storage unit may discharge for compensation. In other words, when the voltage conversion circuit switches from the maximum power state to the non-maximum power state, if the output power of the inverter is adjusted based on an estimated small power increment value (for example, the fourth power increment value), it can be ensured that the inverter converts a part of the direct current electric energy generated by the power supply (for example, the photovoltaic module) into alternating current electric energy and provides the alternating current electric energy for the power grid, and there is no need to decrease the charge power of the energy storage unit or discharge the energy storage unit for compensation. Herein, the fourth power increment value, and may be equal to the first power increment value in some scenarios. The fourth power increment value may be preset based on the power supply parameter of the inverter, the energy storage parameter of the energy storage unit, and/or the grid-connected parameter of the power grid in the application scenario, or may be calculated based on the estimated power increment value of the inverter circuit (or may be calculated based on another parameter that can indicate the capability of outputting electric energy by the voltage conversion circuit) in a previous (for example, when the voltage conversion circuit is in the non-maximum power state last time) time period or several previous time periods (for example, the first time period and the second time period corresponding to a case in which the voltage conversion circuit is in the non-maximum power state last time), or may be calculated in real time based on the current environment (for example, the parameter like the light intensity or the temperature). The fourth power increment value herein may be a power increment value, may be a plurality of discrete power increment values, or may be a power increment interval formed including a plurality of discrete power increment values or continuous power increment values. According to the embodiments, a case in which the photovoltaic system sacrifices energy storage efficiency of the energy storage unit when the voltage conversion circuit switches from the maximum power state to the non-maximum power state can be avoided, stability of the voltage conversion circuit working in the maximum power state can be improved, and power supply efficiency of the photovoltaic system can be improved. A structure is simple, a method is simple, and applicability is high.

In some implementations, the method further includes: setting the estimated power increment value of the inverter circuit to zero when the voltage conversion circuit works in the maximum power state. According to the embodiments, stability of the voltage conversion circuit working in the maximum power state can be improved, and power supply efficiency of the photovoltaic system can be improved. A structure is simple, a method is simple, and applicability is high.

In some implementations, the method further includes: outputting a power adjustment signal the voltage conversion circuit based on the estimated power increment value, and controlling the output power of the inverter circuit by using the power adjustment signal. Herein, the controller may further generate the power adjustment signal based on the estimated power increment value (for example, generate a modulation signal based on the estimated power increment value as the power adjustment signal), and control the inverter circuit and/or the voltage conversion circuit (for example, control the inverter circuit and/or a switching transistor in the voltage conversion circuit) by using the power adjustment signal, to adjust the output power of the inverter circuit, so as to correspondingly adjust the input power of the inverter circuit. A structure is simple, and a control method is simple.

In the embodiments, the photovoltaic inverter may determine a different estimated power increment value based on a power supply capability of the photovoltaic system, and adjust the output power of the inverter based on the estimated power increment value, to improve a speed of tracking the maximum power point by the voltage conversion circuit, improve stability of the voltage conversion circuit in a case in which the voltage conversion circuit works in the maximum power state, and improve power supply efficiency of the photovoltaic system. A structure is simple, a method is simple, and applicability is strong.

The foregoing descriptions are merely implementations of embodiments, but the scope of the embodiments is not limited thereto. Any variation or replacement readily figured out by a person skilled in the art shall fall within the scope of the embodiments.

What is claimed is:

1. A photovoltaic inverter, comprising:
a voltage conversion circuit,
an inverter circuit, and
a controller,
one end of the voltage conversion circuit is configured to connect to a photovoltaic module, the other end of the voltage conversion circuit is configured to connect to one end of the inverter circuit, the other end of the inverter circuit is configured to connect to a power grid, and the inverter circuit and the power grid are connected to a grid-connected point;
the voltage conversion circuit is configured to output, to the inverter circuit, a direct current input by the photovoltaic module;
the inverter circuit is configured to:
receive the direct current output by the voltage conversion circuit,
convert the received direct current output by the voltage conversion circuit into an alternating current, and
output the alternating current to the power grid; and the controller is configured to
increase, based on an output power of the inverter circuit in a current time period and an output power of the inverter circuit in a first time period, an output power of the inverter circuit when the voltage conversion circuit does not work in a maximum power state, wherein an increase in the output power of the inverter circuit is an estimated power increment value of the inverter circuit, the estimated power increment value of the inverter circuit is in direct proportion to a difference between the output power of the inverter circuit in the current time period and the output power of the inverter circuit in the first time period, and the first time period is before the current time period, and obtain a first threshold based upon the estimated power increment value, wherein the first threshold determines whether a capability of outputting electric energy by the voltage conversion circuit is strong.

2. The photovoltaic inverter according to claim 1, wherein the other end of the voltage conversion circuit is configured to;

connect to an energy storage unit, and output, to the energy storage unit, the direct current input by the photovoltaic module; and the inverter circuit is further configured to:

receive the direct current output by the energy storage unit, and convert the received direct current output by the energy storage unit into an alternating current, and output the alternating current to the power grid.

3. The photovoltaic inverter according to claim 1, wherein the controller is further configured to:

when the voltage conversion circuit does not work in the maximum power state, if the difference between the output power of the inverter circuit in the current time period and the output power of the inverter circuit in the first time period is less than the first threshold, set the estimated power increment value of the inverter circuit to a first power increment value.

4. The photovoltaic inverter according to claim 3, wherein the controller is further configured to:

when the voltage conversion circuit does not work in the maximum power state, if the difference between the output power of the inverter circuit in the current time period and the output power of the inverter circuit in the first time period is greater than or equal to the first threshold, and a difference between the output power of the inverter circuit in the current time period and an output power of the inverter circuit in a second time period is less than a second threshold, set the estimated power increment value of the inverter circuit to a second power increment value, wherein the second time period is before the first time period, and the second power increment value is greater than the first power increment value.

5. The photovoltaic inverter according to claim 4, wherein the controller is further configured to:

when the voltage conversion circuit does not work in the maximum power state, if the difference between the output power of the inverter circuit in the current time period and the output power of the inverter circuit in the first time period is greater than or equal to the first threshold, and the difference between the output power of the inverter circuit in the current time period and the output power of the inverter circuit in the second time period is greater than or equal to the second threshold, set the estimated power increment value of the inverter circuit to a third power increment value, wherein the third power increment value is greater than the second power increment value.

6. The photovoltaic inverter according to claim 4, wherein the controller is configured to set the estimated power increment value of the inverter circuit to a fourth power increment value when the voltage conversion circuit switches from the maximum power state to a non-maximum power state, wherein the fourth power increment value is less than the second power increment value.

7. A photovoltaic system, comprising:

one or more photovoltaic inverters, wherein each of the photovoltaic inverter comprises a voltage conversion circuit, an inverter circuit, and a controller, one end of the voltage conversion circuit is configured to connect to a photovoltaic module, the other end of the voltage conversion circuit is configured to connect to one end of the inverter circuit, the other end of the inverter circuit is configured to connect to a power grid, and the inverter circuit and the power grid are connected to a grid-connected point;

the voltage conversion circuit is configured to output, to the inverter circuit, a direct current input by the photovoltaic module;

the inverter circuit is configured to:

receive the direct current output by the voltage conversion circuit, convert the received direct current output by the voltage conversion circuit into an alternating current, and output the alternating current to the power grid; and the controller is configured to increase, based on an output power of the inverter circuit in a current time period and an output power of the inverter circuit in a first time period, an output power of the inverter circuit when the voltage conversion circuit does not work in a maximum power state, wherein an increase in the output power of the inverter circuit is an estimated power increment value of the inverter circuit, the estimated power increment value of the inverter circuit is in direct proportion to a difference between the output power of the inverter circuit in the current time period and the output power of the inverter circuit in the first time period, and the first time period is before the current time period, and obtain a first threshold based upon the estimated power increment value, wherein the first threshold determines whether a capability of outputting electric energy by the voltage conversion circuit is strong.

8. The photovoltaic inverter according to claim 7, wherein the other end of the voltage conversion circuit is further configured to:

connect to an energy storage unit, and output, to the energy storage unit, the direct current input by the photovoltaic module; and the inverter circuit is further configured to:

receive the direct current output by the energy storage unit, and convert the received direct current output by the energy storage unit into an alternating current, and output the alternating current to the power grid.

9. The photovoltaic inverter according to claim 7, wherein the controller is further configured to:

when the voltage conversion circuit does not work in the maximum power state, if the difference between the output power of the inverter circuit in the current time period and the output power of the inverter circuit in the first time period is less than the first threshold, set the estimated power increment value of the inverter circuit to a first power increment value.

10. The photovoltaic inverter according to claim 9, wherein the controller is further configured to:

when the voltage conversion circuit does not work in the maximum power state, if the difference between the output power of the inverter circuit in the current time period and the output power of the inverter circuit in the first time period is greater than or equal to the first threshold, and a difference between the output power of the inverter circuit in the current time period and an output power of the inverter circuit in a second time period is less than a second threshold, set the estimated power increment value of the inverter circuit to a second power increment value, wherein the second time period is before the first time period, and the second power increment value is greater than the first power increment value.

11. The photovoltaic inverter according to claim 10, wherein the controller is further configured to:

when the voltage conversion circuit does not work in the maximum power state, if the difference between the output power of the inverter circuit in the current time period and the output power of the inverter circuit in the first time period is greater than or equal to the first threshold, and the difference between the output power of the inverter circuit in the current time period and the output power of the inverter circuit in the second time period is greater than or equal to the second threshold, set the estimated power increment value of the inverter circuit to a third power increment value, wherein the third power increment value is greater than the second power increment value.

12. The photovoltaic inverter according to claim 10, wherein the controller is further configured to:

set the estimated power increment value of the inverter circuit to a fourth power increment value when the voltage conversion circuit switches from the maximum power state to a non-maximum power state, wherein the fourth power increment value is less than the second power increment value.

13. A control method of a photovoltaic inverter, wherein the control method is applicable to a photovoltaic inverter, and the photovoltaic inverter comprises a voltage conversion circuit, an inverter circuit, and a controller;

one end of the voltage conversion circuit is configured to connect to a photovoltaic module, the other end of the voltage conversion circuit is configured to connect to one end of the inverter circuit, the other end of the inverter circuit is configured to connect to a load and a power grid, and the inverter circuit and the power grid are connected to a grid-connected point;

the voltage conversion circuit is configured to output, to the inverter circuit, a direct current input by the photovoltaic module; and the inverter circuit is configured to:

receive the direct current output by the voltage conversion circuit, convert the received direct current output by the voltage conversion circuit into an alternating current, and output the alternating current to the power grid; and the method comprises:

increasing, based on an output power of the inverter circuit in a current time period and an output power of the inverter circuit in a first time period, an output power of the inverter circuit when the voltage conversion circuit does not work in a maximum power state, wherein an increase in the output power of the inverter circuit is an estimated power increment value of the inverter circuit, the estimated power increment value of the inverter circuit is in direct proportion to a difference between the output power in the current time period and the output power in the first time period, and the first time period is before the current time period; and obtaining a first threshold based upon the estimated power increment value, wherein the first threshold determines whether a capability of outputting electric energy by the voltage conversion circuit is strong.

14. The control method according to claim 13, wherein the other end of the voltage conversion circuit is further configured to:

connect to an energy storage unit, and output, to the energy storage unit, the direct current input by the photovoltaic module; and the inverter circuit is further configured to:

receive the direct current output by the energy storage unit, and convert the received direct current output by the energy storage unit into an alternating current, and output the alternating current to the power grid.

15. The control method according to claim 13, wherein increasing, based on the output power of the inverter circuit in the current time period and the output power of the inverter circuit in the first time period, the output power of the inverter circuit when the voltage conversion circuit does not work in a maximum power state, comprises:

when the voltage conversion circuit does not work in the maximum power state, if the difference between the output power of the inverter circuit in the current time period and the output power of the inverter circuit in the first time period is less than the first threshold, setting the estimated power increment value of the inverter circuit to a first power increment value.

16. The control method according to claim 15, wherein increasing, based on the output power of the inverter circuit in the current time period and the output power of the inverter circuit in the first time period, the output power of the inverter circuit when the voltage conversion circuit does not work in the maximum power state, comprises:

when the voltage conversion circuit does not work in the maximum power state, if the difference between the output power of the inverter circuit in the current time period and the output power of the inverter circuit in the first time period is greater than or equal to the first threshold, and a difference between the output power of the inverter circuit in the current time period and an output power of the inverter circuit in a second time period is less than a second threshold, setting the estimated power increment value of the inverter circuit to a second power increment value, wherein the second time period is before the first time period, and the second power increment value is greater than the first power increment value.

17. The control method according to claim 16, wherein increasing, based on the output power of the inverter circuit in the current time period and the output power of the inverter circuit in the first time period, the output power of the inverter circuit when the voltage conversion circuit does not work in the maximum power state, comprises:

when the voltage conversion circuit does not work in the maximum power state, if the difference between the output power of the inverter circuit in the current time period and the output power of the inverter circuit in the first time period is greater than or equal to the first threshold, and the difference between the output power of the inverter circuit in the current time period and the output power of the inverter circuit in the second time period is greater than or equal to the second threshold, setting the estimated power increment value of the inverter circuit to a third power increment value, wherein the third power increment value is greater than the second power increment value.

18. The control method according to claim 16, further comprising:

setting the estimated power increment value of the inverter circuit to a fourth power increment value when the voltage conversion circuit switches from the maximum power state to a non-maximum power state, wherein the fourth power increment value is less than the second power increment value.

\* \* \* \* \*